United States Patent
Thomas et al.

(10) Patent No.: US 10,318,320 B1
(45) Date of Patent: Jun. 11, 2019

(54) VIRTUAL DESKTOP ACCESS USING DEVICE-NATIVE USER INTERFACES

(71) Applicant: Amazon Technologies, Inc., Seattle, WA (US)

(72) Inventors: Nathan Bartholomew Thomas, Seattle, WA (US); Lihao Wang, Seattle, WA (US); Arivanandam Rajaraman, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 692 days.

(21) Appl. No.: 14/961,700

(22) Filed: Dec. 7, 2015

(51) Int. Cl.
| | |
|---|---|
| *G06F 3/048* | (2013.01) |
| *G06F 9/451* | (2018.01) |
| *G06F 9/455* | (2018.01) |
| *G06F 9/50* | (2006.01) |
| *H04L 29/08* | (2006.01) |
| *G06F 3/0484* | (2013.01) |

(52) U.S. Cl.
CPC ............ *G06F 9/452* (2018.02); *G06F 3/0484* (2013.01); *G06F 9/45558* (2013.01); *G06F 9/5077* (2013.01); *H04L 67/025* (2013.01); *G06F 2009/45595* (2013.01)

(58) Field of Classification Search
CPC .... G06F 9/452; G06F 3/0484; G06F 9/45558; G06F 9/5077; G06F 2009/45595; H04L 67/025
USPC .......................................................... 715/740
See application file for complete search history.

(56) References Cited

U.S. PATENT DOCUMENTS

| | | | | |
|---|---|---|---|---|
| 6,725,238 | B1* | 4/2004 | Auvenshine | ...... G06F 17/30194 |
| 7,275,212 | B2* | 9/2007 | Leichtling | ............. G06F 3/1454 |
| | | | | 345/629 |
| 7,418,472 | B2* | 8/2008 | Shoemaker | ....... H04L 29/06027 |
| | | | | 709/203 |
| 8,650,494 | B1* | 2/2014 | Sampath | ................. H04L 67/02 |
| | | | | 715/740 |
| 9,197,697 | B2 | 11/2015 | Morton et al. | |
| 2002/0032763 | A1 | 3/2002 | Cox et al. | |

(Continued)

OTHER PUBLICATIONS

U.S. Appl. No. 14/516,233, filed Oct. 16, 2014, Sheshadri Supreeth Koushik, et al.

(Continued)

*Primary Examiner* — David Phantana-angkool
(74) *Attorney, Agent, or Firm* — Robert C. Kowert; Meyertons, Hood, Kivlin, Kowert & Goetzel, P.C.

(57) ABSTRACT

Methods, systems, and computer-readable media for virtual desktop access using device-native user interfaces are disclosed. A virtual desktop instance is implemented on behalf of a user. One or more applications are installed on the virtual desktop instance and executed using a virtualized computing resource instance. Data associated with the virtual desktop instance is sent to a first user device that implements a first device platform. A first graphical user interface (GUI) for the virtual desktop interface is generated using the data and displayed on a first display of the first device. The data is sent to a second user device that implements a second device platform differing from the first device platform. A second GUI for the virtual desktop interface is generated using the data and displayed on a second display of the second device. The second GUI differs at least in part from the first GUI.

20 Claims, 14 Drawing Sheets

(56) References Cited

U.S. PATENT DOCUMENTS

| | | | |
|---|---|---|---|
| 2002/0111995 A1* | 8/2002 | Mansour | H04L 29/06 709/203 |
| 2007/0256073 A1 | 11/2007 | Troung et al. | |
| 2009/0198805 A1 | 8/2009 | Ben-Shaul et al. | |
| 2010/0269046 A1* | 10/2010 | Pahlavan | G06F 3/1462 715/740 |
| 2010/0269047 A1* | 10/2010 | Pahlavan | H04L 63/08 715/740 |
| 2011/0295998 A1 | 12/2011 | Ferris et al. | |
| 2012/0054841 A1 | 3/2012 | Schultz et al. | |
| 2012/0226985 A1* | 9/2012 | Chervets | G06F 9/452 715/735 |
| 2012/0311457 A1* | 12/2012 | O'Gorman | G06F 9/452 715/740 |
| 2013/0042309 A1 | 2/2013 | Ozzie et al. | |
| 2013/0055102 A1* | 2/2013 | Matthews | G06F 9/44505 715/740 |
| 2013/0117804 A1 | 5/2013 | Chawla et al. | |
| 2013/0132856 A1* | 5/2013 | Binyamin | G06F 3/017 715/740 |
| 2013/0246932 A1* | 9/2013 | Zaveri | G06F 3/017 715/740 |
| 2013/0290856 A1* | 10/2013 | Beveridge | G06F 9/452 715/740 |
| 2013/0290857 A1* | 10/2013 | Beveridge | G06F 3/0484 715/740 |
| 2014/0013234 A1* | 1/2014 | Beveridge | G06F 3/0484 715/740 |
| 2014/0082512 A1* | 3/2014 | Neuert | G06F 3/048 715/744 |
| 2014/0258155 A1 | 9/2014 | Suryanarayanan et al. | |
| 2014/0280961 A1 | 9/2014 | Martinez et al. | |

OTHER PUBLICATIONS

U.S. Appl. No. 14/537,789, filed Nov. 10, 2014, Sheshadri Supreeth Koushik, et al.

U.S. Appl. No. 14/536,583, filed Nov. 7, 2014, Sheshadri Supreeth Koushik.

U.S. Appl. No. 14/538,725, filed Nov. 11, 2014, Sheshadri Supreeth Koushik.

U.S. Appl. No. 14/538,734, filed Nov. 11, 2014, Sheshadri Supreeth Koushik.

U.S. Appl. No. 14/583,714, filed Nov. 11, 2014, Frederik Christophe Delacourt.

* cited by examiner

VIRTUAL DESKTOP ACCESS USING DEVICE-NATIVE USER INTERFACES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Many large companies are attempting to move data center resources to cloud computing environments. These companies may use large amounts of desktop computing software that must be procured, kept up-to-date, and distributed across many desktop computers in multiple locations. Traditionally, in order to execute an application, an end user within a company would log into a physical machine, navigate to a vendor site, download an application, physically install the application on their own computer (which may include choosing an option for automatically installing updates to the application or an option for receiving notifications of available updates), and execute the application locally (on their own computer). Subsequently, when and if the end user is finished using the application, the end user might uninstall the application.

For a large enterprise, it can be difficult to keep all of the applications they may wish to use up to date using the traditional approach of physically installing applications on each machine. For example, deploying and managing applications at scale is difficult, complex and requires expensive on premise infrastructure. In addition, updates and patches are complex to deploy without affecting user productivity, and legacy applications typically only run on older operation system versions. It can be difficult for a large enterprise to deploy applications on-demand and their own line-of-business applications. In many cases, there is a lack of transparency into cost controls, spending and usage related to desktop applications. Therefore, large enterprises can miss opportunities for license synergies across the organization.

Figure 1:
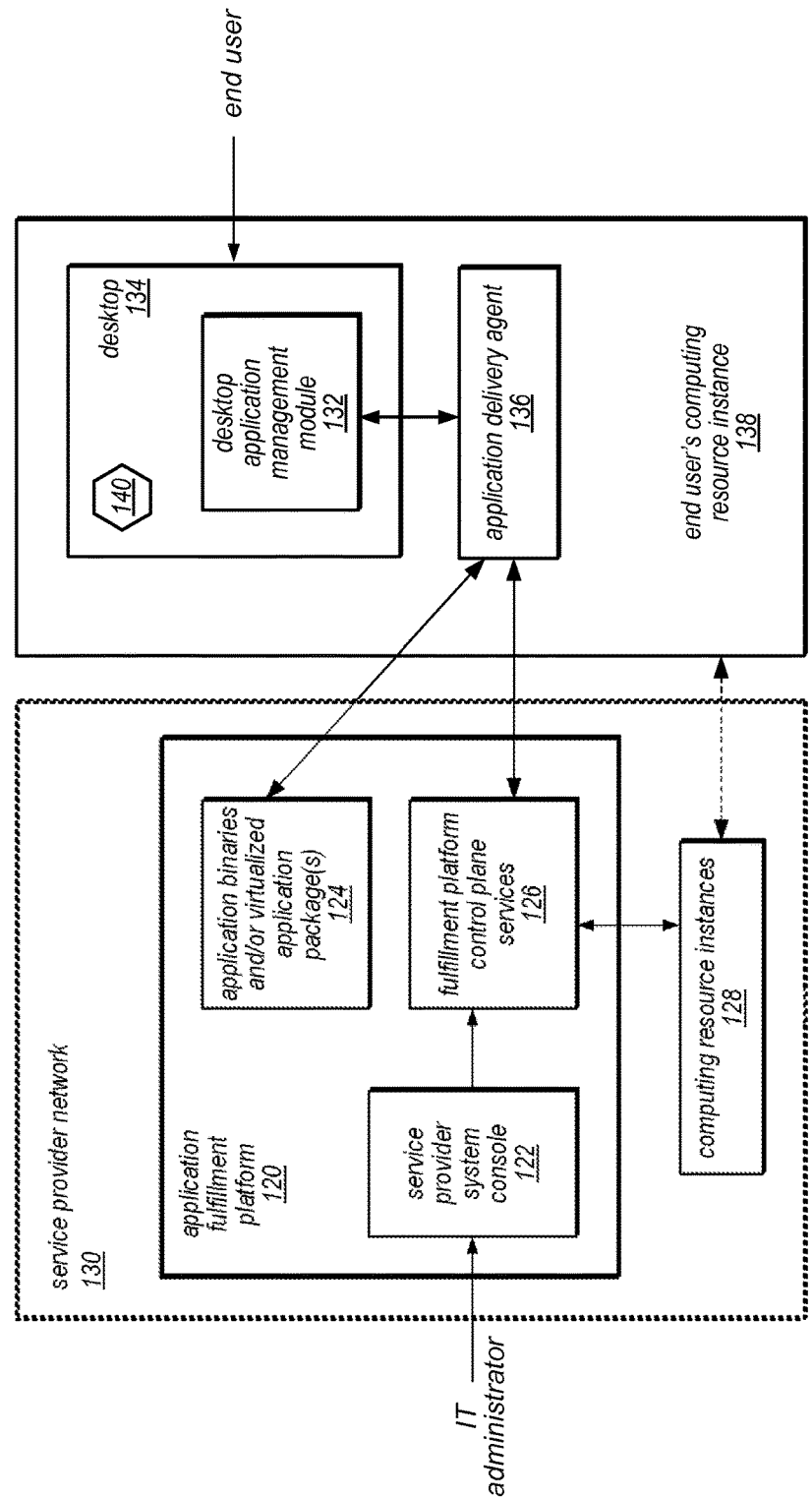
FIG. 1 is a block diagram illustrating one embodiment of a service provider system that is configured to provide on-demand delivery of applications to computing resource instances of its customers' end users.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems, methods, and computer-readable media for virtual desktop access using device-native user interfaces are described herein. In a service provider system that provides virtualized computing resources to clients, a virtual desktop service may provide virtual desktop instances with applications (e.g., desktop applications) to clients. A given end user may operate heterogeneous user devices that connect to the same virtual desktop instance. For example, the same user may access a virtual desktop instance with a smartphone, a tablet, and a desktop computer. The user devices may implement different device platforms (e.g., they may run different families of operating systems and/or use different families of hardware components) and may differ in the native appearance of their graphical user interfaces (GUIs) and/or interaction capabilities (e.g., in the type of user input hardware they include or support, such as the differences between mobile and desktop operating systems). The displays associated with the user devices may also have different characteristics, such as different dimensions (e.g., in terms of pixels), different physical sizes, different color depths, and/or the presence or absence of touchscreen input capability. Using the techniques described herein, a uniform interface to a single virtual desktop instance may be provided to the heterogeneous user devices, and each of the user devices may (in parallel) render and display a GUI for the virtual desktop that emulates the native appearance and interaction capability of the device platform. Accordingly, the various GUIs for the virtual desktop instance may vary from user device to user device in a manner that generally preserves the "look and feel" of other software (such as operating system software) on the devices.

On-Demand Delivery of Applications to Virtual Desktops

Various embodiments of systems and methods for providing applications (e.g., desktop applications) through an application fulfillment platform in a service provider system that provides virtualized computing resources to clients are described herein. The systems and methods described herein may provide on-demand delivery and installation of desktop applications to virtual desktop instances in a cloud computing environment for the benefit of end users (e.g., employees or members of a business, enterprise, or other organization that is a customer of the service provider). In some embodiments, the application fulfillment platform may employ a variety of services to manage collections of applications (e.g., catalogs or portfolios of applications) and to deliver virtualized application packages to end user machines or virtual desktop instances.

In some embodiments, customers of a service provider (e.g., buyers or IT administrators within an enterprise) may be able to discover and subscribe to third party applications (or applications that have been purchased or licensed from a third party by the service provider) on-demand and make them available to their end users on virtual desktop instances. In addition, an IT administrator of a customer may be able to publish and manage the customer's own line-of-business applications, which may be accessible only for their end users.

The systems described herein may provide customers the flexibility to build and curate a selection of applications (including those discovered and/or sourced through a desktop application management module) while maintaining secure, scalable and streamlined delivery of applications to their end users. In some embodiments, customers may benefit from on-demand access to applications (e.g., desktop applications) through flexibility, convenience and the use of a pay-as-you-go feature. In addition, customers may be able to manage their diverse application portfolios without making expensive up-front investments. The application fulfillment and management services provided by the systems described herein may be suitable for virtual computing instance customers (e.g., virtual desktop customers) in a variety of industries and sectors, including retailers, financial services providers, technology companies, and customers in the transportation sector.

In various embodiments, the application fulfillment platforms described herein may provide IT administrators full control over their virtual desktop instances with dynamic application management tools. For example, IT administrators in customer organizations may be able to build application catalogs or portfolios for their end users that are composed of applications sourced through the platform and/or their own private applications, where a portfolio is a collection of applications and corresponding policies (including maintenance schedules and license types), which can be assigned to end users or groups of users. In some embodiments, at least some applications (e.g., required applications) may be pre-installed on the virtual desktop instances that are provisioned for a customer's end users. In some embodiments, customers may allow their end users to install applications on-demand. IT administrators may interact with the application fulfillment platforms through a management console (sometimes referred to herein as a service provider system console or an administrator console) that offers IT administrators access to the tools for managing catalogs or portfolios, application updates, policies, application licenses and/or their own private applications. These tools may include a dashboard that enables IT administrators to easily ingest, package and deliver private applications to their end users. In some embodiments, IT administrators may be able to fully control application updates, which may be installed in the background, and may be non-disruptive to users even if they are using an application that is being updated. The systems described herein may allow customers to efficiently manage their software application spending with detailed usage reports and monthly subscriptions. Because the service provider may be able to negotiate bulk and/or wholesale prices from application vendors, the service provider may be able to offer them to customer (e.g., individually or in bundles containing groups of popular applications) with competitive pricing.

As described in more detail below, the application fulfillment platforms described herein may provide a self-service model to end users through an application (e.g., a desktop application management module) on their virtual desktop instances. For example, through this application, end users can discover and manage an application portfolio that best fits their needs, with the ability to install applications marked as optional by their IT administrators. IT administrators may also have the option to authorize their users to be able to request access to additional applications and/or to receive notifications of new applications or application updates as they become available. In some embodiments, the application fulfillment platforms described herein may preserve application state by automatically backing up applications and application data, which may enable subsequent restoration (e.g., in the case of a machine failure), provide the ability to roll back the application state to a specific point in time, and/or provide the flexibility to work across multiple virtual desktop instance and/or computing devices.

In the context of the application fulfillment platforms described herein, the terms "customer" and "buyer" may refer to an enterprise, a business, or another organization that receives application management and/or fulfillment services on behalf of their end users from a service provider through such a platform. In this context, the term "sellers" may refer to software vendors that provide their applications for use within the application fulfillment platforms described herein, and the terms "users" and "end users" may refer to employees or members of the enterprise, business, or other organization that receives application management and/or fulfillment services on their behalf from a service provider through such a platform. Users may access applications that are fulfilled through these platforms on their own computing resources instances (e.g., on end user machines and/or virtual desktop instances).

In some embodiments, applications (e.g., desktop applications) may be delivered to various end users' virtual desktop instances using an application virtualization technology that safely encapsulates and isolates applications in dedicated containers. For example, a packaging service implemented on the application fulfillment platform may be configured to transform applications into virtualized application packages and to deliver them to virtual desktop instances or physical desktops running over an operating system on an end user's machine. The virtualized application packages, when executed, may perform and behave as if they are natively installed, without the need for actual installation. In some embodiments, this approach may simplify application patch management because patches do not need to be pushed to individual desktops. In some embodiments, the packaging service may be invoked by IT administrators or other IT professionals to convert and validate traditional desktop applications into virtual applications that are compatible with the application fulfillment platforms (and services thereof) that are described herein.

As described in detail herein, an application fulfillment platform may offer customers (or more specifically, IT administrators of those customers) the ability to provision applications on-demand at scale while maintaining centralized control, security and compliance. For example, in some embodiments, these platforms (and corresponding services thereof) may be integrated with a management console through which the IT administrators may discover and subscribe to a broad selection of applications from a variety of sources, build a catalog of applications from a variety of sources and having a variety of subscription/licensing models, control access to applications with granular access policy enforcement on a per user basis, manage application updates, access detailed usage reports for their enterprise, application portfolios and end users, and/or monitor real-time installs as well as license activation on a per application basis.

In some embodiments, the application fulfillment platforms described herein may be integrated with or may be configured to operate in conjunction with a service provider enterprise catalog, e.g., a service that enables administrators to create private catalogs of products and resources from a variety of suppliers and to share them with a specific set of users. These products may include not only desktop applications to be delivered to virtual desktop instances as virtualized application packages, but may also include server applications (e.g., applications to be executed on a server on behalf of a customer or end user) and/or applications to be delivered as executable files (e.g., application binaries) to be installed on an end user's computing device or virtual desktop instance. If the service provider enterprise catalog is used to create a catalog or portfolio of desktop applications, these applications may be installed as virtualized application packages on an end user's computing resource instance at a later time (e.g., on-demand), as described herein. In some embodiments, the service provider enterprise catalog may enable administrators to offer a standard set of products that meet organizational requirements, and may offer users an opportunity to discover products via a familiar on-line-shopping-type experience, provision service provider resources for their own use, and/or manage service provider resources through a service provider system console. In some embodiments, organizations may benefit from the use of the service provider enterprise catalog through increased standardization, enforced compliance with policies, and improved agility.

In some embodiments, an application fulfillment platform may receive input specifying an intended state of the platform for a given end user and may invoke various services and workflows to translate that intent into reality. This may include provisioning one or more applications on the end user's desktop (e.g., physically installing them on the user's machine, or installing them in a cloud computing environment through a virtual desktop instance). When the end user begins to use one of the applications, the application fulfillment platform (or a component thereof) may manage its subscription, which may trigger metering and billing messages (e.g., emails) and may involve managing third party software licenses for the application, in some cases.

As described herein, a whole enterprise (e.g., a service provider customer) may be represented in the service provider system (and/or in an application fulfillment platform of the service provider system) by an IT administrator who interacts with the system through service provider system console. After logging into the console, the IT administrator may be able to perform a variety of different actions, many of which fall into one of three broad categories. The first category involves action related to building their own catalog, which is a collection of applications that may include their own line-of-business (e.g., custom) applications, applications for which the enterprise has purchased licenses (which may be included in the catalog under a "bring your own license" model), and/or applications purchased from the service provider itself.

In a second category of actions, the IT administrator may (e.g., through the service provider system console) perform actions related to assigning particular applications to specific end users (and/or user groups). For example, an IT administrator may be able to select one or more end users and/or user groups in its active directory and may be able to assign applications (e.g., one or more desktop applications) to the selected end users and/or user groups. For example, the IT administrator may be able to assign an office productivity suite, a data analysis application and/or a browser application to the selected end user(s) and/or user group(s).

In a third category of actions, the IT administrator may (e.g., through the service provider system console) perform actions related to generating, obtaining, and/or viewing reports indicating the usage of the applications that are provided through the service to their end users. The information in these reports may be used by the IT administrator to determine which of several available licensing models may be most suitable for the software being used by their organization.

One embodiment of a service provider system that is configured to provide on-demand delivery of applications (e.g., desktop applications) to computing resource instances of its customers' end users is illustrated by the block diagram in FIG. 1. As illustrated in this example, the system, implemented on service provider network 130, may include an application fulfillment platform (shown as application fulfillment platform 120). The application fulfillment platform may include an interface mechanism (shown as service provider system console 122) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator may log into application fulfillment platform 120 (e.g., through a browser or a dedicated client-side application) to access service provider system console 122. The IT administrator may then provide input (e.g., requests for service entered in a graphical user interface of service provider system console 122) in order to create a catalog of applications to be provisioned for the use of their end users, to assign applications to particular end users or user groups, or to generate, obtain, or view usage reports for the applications in the catalog by their end users.

As illustrated in this example, application fulfillment platform 120 may include multiple fulfillment platform control plane services 126, various ones of which may be invoked in response to the inputs received from the IT administrator. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identity service, and/or a proxy service. These services, and other components of an application fulfillment platform such as application fulfillment platform 120, are described in more detail below, according to at least some embodiments. As illustrated at 124, in this example, applications may be delivered to end users as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances.

In some embodiments, an application delivery agent (such as application delivery agent 136) and a desktop application management module (such as desktop application management module 132) may be installed on the end user's computing resources instance 138. In various embodiments, computing resource instance 138 may be a physical computing device (e.g., a desktop or laptop computer, a tablet computing device, or a smart phone) or may be a virtualized computing resource instance (e.g., one that implements a virtual desktop instance). Application delivery agent 136 (which may be a client component of application fulfillment platform 120) may be configured to communicate with various fulfillment platform control place services 126 in order to fulfill requests to subscribe to, install, and/or execute applications selected through desktop application management module 132 or through another user interface mechanism (e.g., application icon 140 on desktop 134 or a start menu item). In other words, desktop application management module 132 is an application that may be installed on the end user's computing resource instance 138 to allow the end user to interact with application fulfillment platform 120 through application delivery agent 136. In some embodiments, application delivery agent 136 may include a runtime engine component that is configured to execute the instructions of a virtualized application package 124 that is delivered (e.g., using demand paging) for a selected application. The functionality of an application delivery agent is described in more detail below, according to at least some embodiments.

As illustrated in FIG. 1, the service provider network may include physical and/or virtualized computing resource instances (e.g., computing resource instances and/or storage resource instances) that may be provisioned on behalf of the business, enterprise, or organization (and its end users). In some embodiments, these computing resources instances (shown as computing resource instances 128 on service provider network 130) may be configured to implement a remote computing application that allows end users to access applications executing on computing resource instances 128 as if they were installed and executing locally on their machine. For example, in some embodiments, one or more of these computing resources instances 128 may be configured to implement a virtual desktop instance (which may serve as the end user's computing resource instance 138) on which an application delivery agent 136 and a desktop application management module 132 are installed. In such embodiments, desktop 134 in FIG. 1 may represent a view presented by the virtual desktop instance and may appear to the end user as if it were a desktop on the end user's local (physical) computing device. In some embodiments, service provider network 130 may also include storage resources outside of application fulfillment platform 120 (which may be managed by a storage service implemented within service provider network 130) that are configured to store data utilized by application fulfillment platform 120 (not shown). In various embodiments, application binaries, virtualized application packages, various tables that store information about applications and collections thereof, application state data, or other information used to provide on-demand delivery of desktop applications to end users may be stored outside of application fulfillment platform 120 instead of, or in addition to, within application fulfillment platform 120.

As illustrated in this example, desktop application management module 132 (through which the end user may select applications for installation or execution) may execute on the end user's computing resource instance 138, and a graphical user interface of desktop application management module 132 may be displayed on desktop 134. For example, this interface may present a list of applications for selection by the end user (e.g., in order to subscribe to, install, and/or execute an application). In addition, a shortcut or icon for an application (shown as element 140 in FIG. 1) may be displayed on desktop 134 and may be selected in order to launch the corresponding application (e.g., desktop application management module 132, or one of the applications delivered for execution on computing resource instance 138 in response to its selection, by the end user, within desktop application management module 132).

Figure 12:
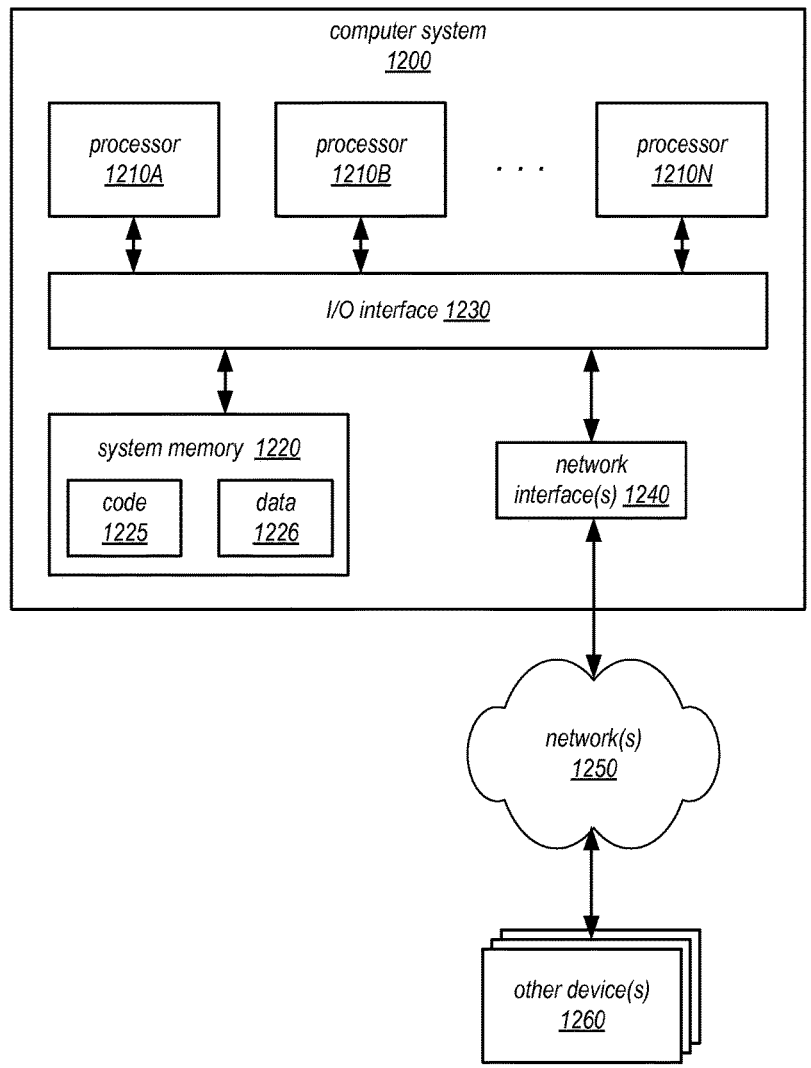
FIG. 12 is a block diagram illustrating an example computer system that implements some or all of the techniques described herein, according to different embodiments.

The systems and methods described herein may be implemented on or by one or more computing systems within a network environment, in different embodiments. An example computer system on which embodiments of the techniques for providing on-demand delivery of desktop applications to desktops on physical computing devices and/or virtual desktops in a cloud computing environment described herein may be implemented is illustrated in FIG. 12. Embodiments of various systems and methods for implementing these techniques are generally described herein in the context of a service provider that provides to clients, via an intermediate network such as the Internet, virtualized resources (e.g., virtualized computing and storage resources) implemented on a provider network of the service provider. FIG. 2 through FIG. 5 and FIG. 12 (and the corresponding descriptions thereof) illustrate and describe example environments in which embodiments of the systems and methods described herein may be implemented, and are not intended to be limiting. In at least some embodiments, at least some of the resources provided to clients of the service provider via the provider network may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider may access one or more services of the provider network via application programming interfaces (APIs) to the services to obtain and configure resource instances and to establish and manage virtual network configurations that include the resource instances, for example virtualized private networks.

Figure 5:
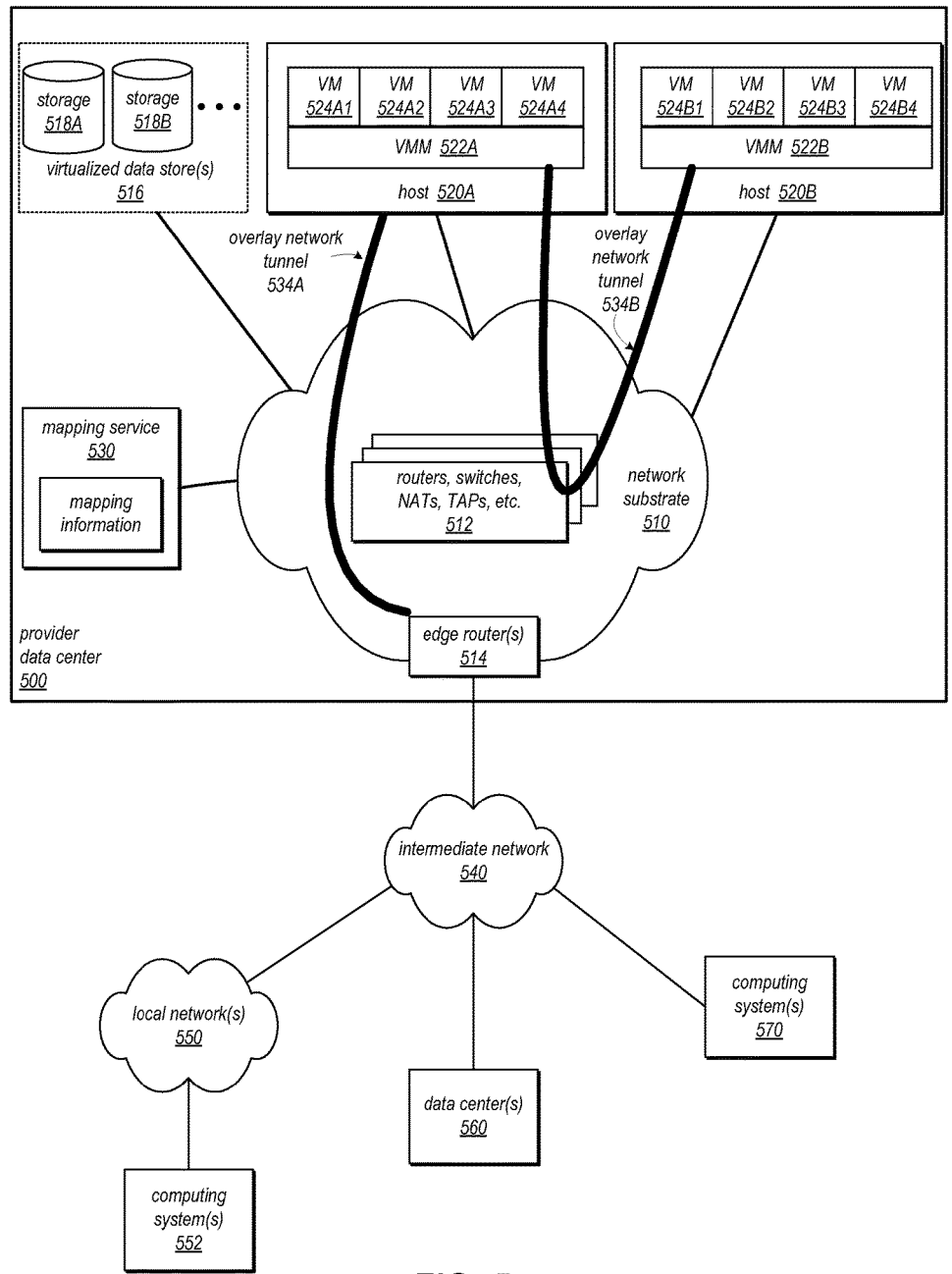
FIG. 5 is a block diagram illustrating an example service provider data center, according to at least some embodiments.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 5 and described in detail below.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

Figure 2:
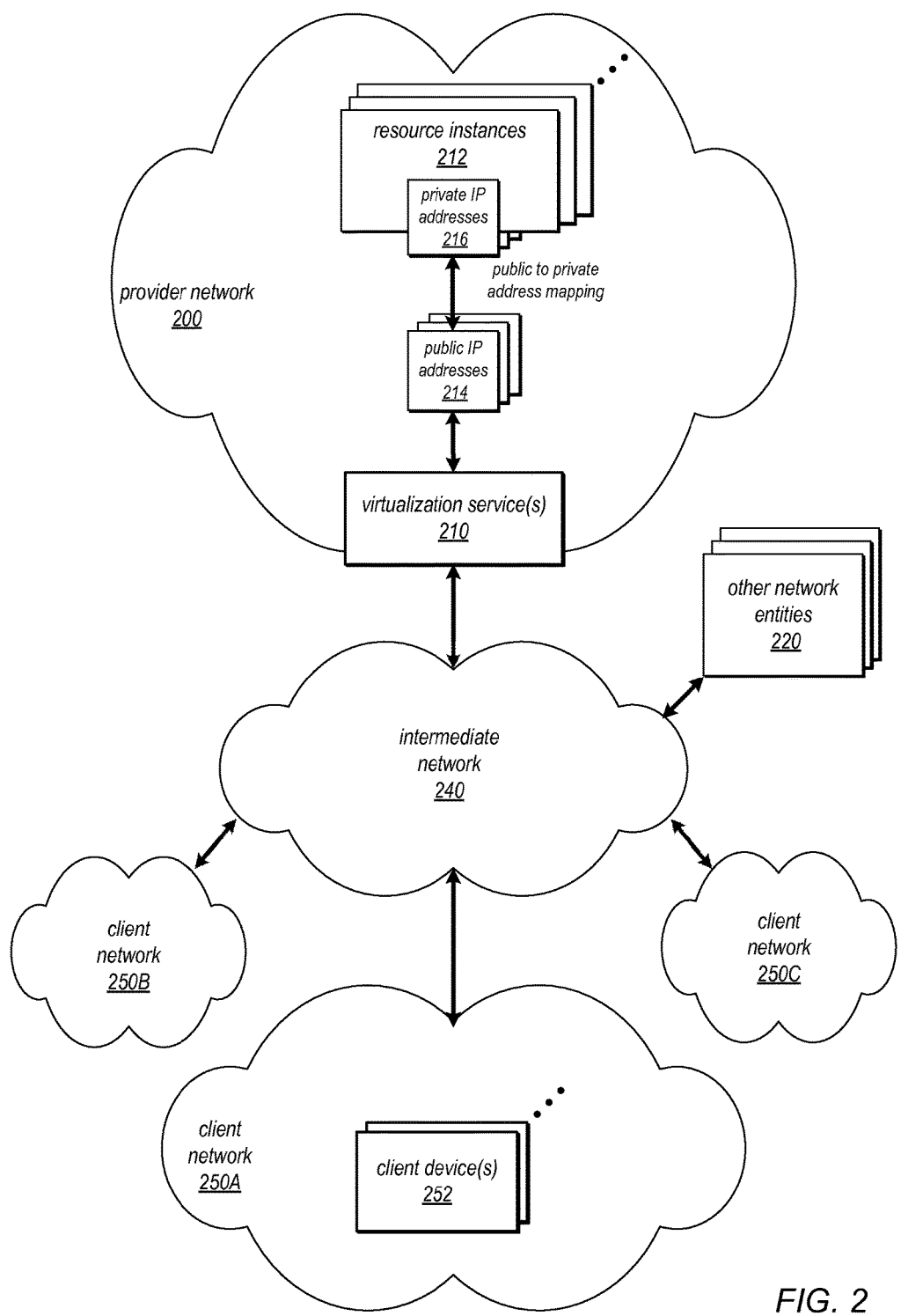
FIG. 2 is a block diagram illustrating an example provider network environment, according to at least some embodiments.

FIG. 2 illustrates an example provider network environment, according to at least some embodiments. A provider network 200 may provide resource virtualization to clients via one or more virtualization services 210 that allow clients to purchase, rent, or otherwise obtain instances 212 of virtualized resources, including but not limited to computation and storage resources, implemented on devices within the provider network or networks in one or more data centers. As described in more detail below, in some embodiments, provider network 200 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 200. Private IP addresses 216 may be associated with the resource instances 212; the private IP addresses are the internal network addresses of the resource instances 212 on the provider network 200. In some embodiments, the provider network 200 may also provide public IP addresses 214 and/or public IP address ranges (e.g., Internet Protocol version 4 (IPv4) or Internet Protocol version 6 (IPv6) addresses) that clients may obtain from the provider 200.

Conventionally, the provider network 200, via the virtualization services 210, may allow a client of the service provider (e.g., a client that operates client network 250A, 250B, or 250C, each of which may include one or more client devices 252) to dynamically associate at least some public IP addresses 214 assigned or allocated to the client with particular resource instances 212 assigned to the client. The provider network 200 may also allow the client to remap a public IP address 214, previously mapped to one virtualized computing resource instance 212 allocated to the client, to another virtualized computing resource instance 212 that is also allocated to the client. For example, using the virtualized computing resource instances 212 and public IP addresses 214 provided by the service provider, a client of the service provider such as the operator of client network 250A may implement client-specific applications and present the client's applications on an intermediate network 240, such as the Internet. Other network entities 220 on the intermediate network 240 may then generate traffic to a destination public IP address 214 published by the client network 250A; the traffic is routed to the service provider data center, and at the data center is routed, via a network substrate, to the private IP address 216 of the virtualized computing resource instance 212 currently mapped to the destination public IP address 214. Similarly, response traffic from the virtualized computing resource instance 212 may be routed via the network substrate back onto the intermediate network 240 to the source entity 220.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 200; a client may then assign their allocated public IP addresses to particular resource instances allocated to the client. These public IP addresses may be referred to as client public IP addresses, or simply client IP addresses. Instead of being assigned by the provider network 200 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 212 that are made available to clients (e.g., client devices 252) via virtualization service(s) 210 may include multiple network interfaces. For example, some of them may include one network interface for communicating with various components of a client network 250 and another network interface for communicating with resources or other network entities on another network that is external to provider network 200 (not shown).

Figure 3:
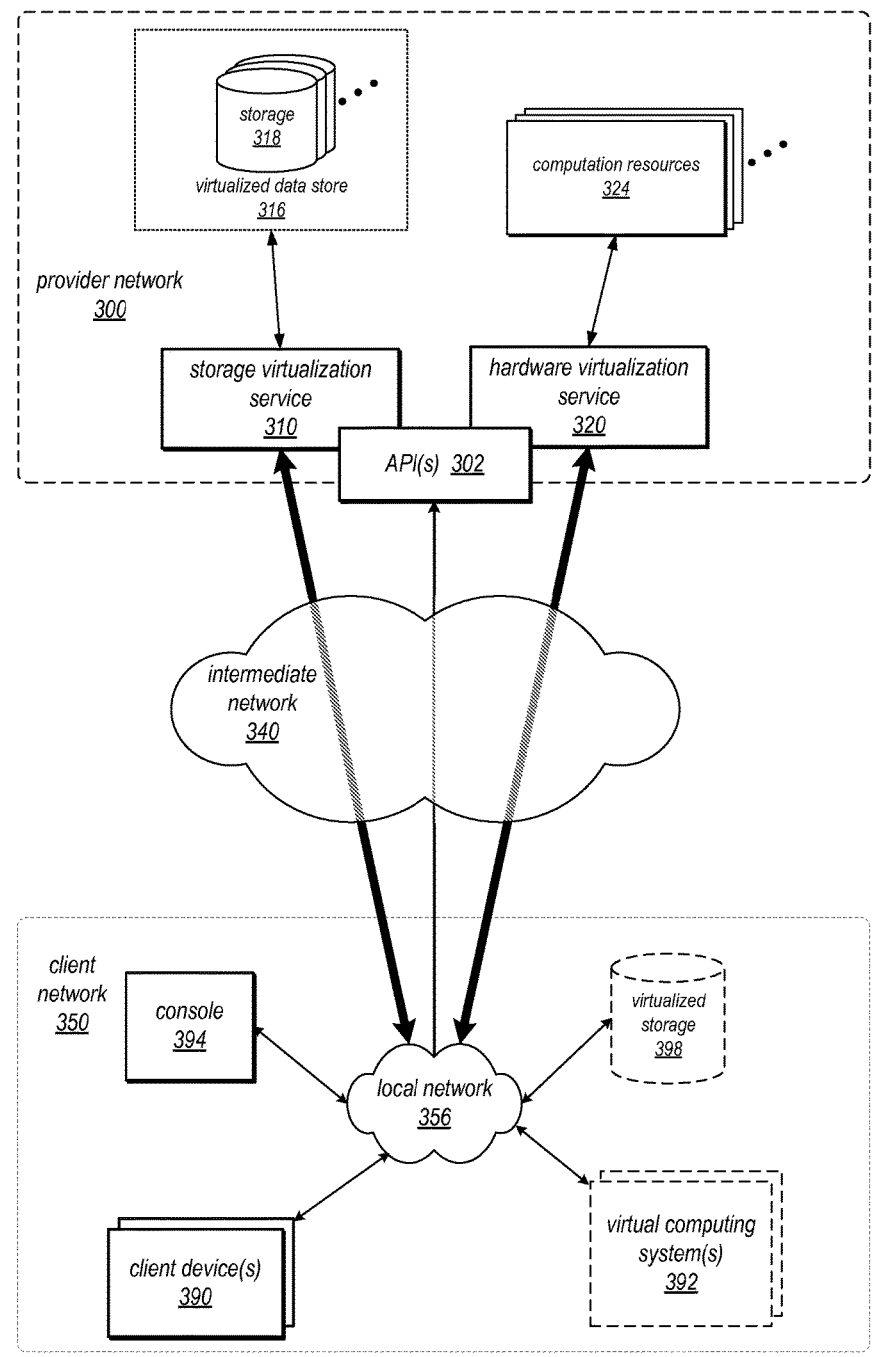
FIG. 3 is a block diagram illustrating an example provider network that provides a storage virtualization service and a hardware virtualization service to clients, according to at least some embodiments.

FIG. 3 is a block diagram of another example provider network environment, one that provides a storage virtualization service and a hardware virtualization service to clients, according to at least some embodiments. In this example, hardware virtualization service 320 provides multiple computation resources 324 (e.g., VMs) to clients. The computation resources 324 may, for example, be rented or leased to clients of the provider network 300 (e.g., to a client that implements client network 350). As noted in the previous example, in some embodiments, provider network 300 may also provide application virtualization for the benefit of its customers and their end users (e.g., through a packaging service), and may provide on-demand delivery of desktop applications to desktops on physical computing devices and/or virtual desktops through an application fulfillment platform implemented using various resources of service provider network 300. In this example, each computation resource 324 may be provided with one or more private IP addresses. Provider network 300 may be configured to route packets from the private IP addresses of the computation resources 324 to public Internet destinations, and from public Internet sources to the computation resources 324.

Provider network 300 may provide a client network 350, for example coupled to intermediate network 340 via local network 356, the ability to implement virtual computing systems 392 via hardware virtualization service 320 coupled to intermediate network 340 and to provider network 300. In some embodiments, hardware virtualization service 320 may provide one or more APIs 302, for example a web services interface, via which a client network 350 may access functionality provided by the hardware virtualization service 320, for example via a console 394. In at least some embodiments, at the provider network 300, each virtual computing system 392 at client network 350 may correspond to a computation resource 324 that is leased, rented, or otherwise provided to client network 350.

From an instance of a virtual computing system 392 and/or another client device 390 or console 394, the client may access the functionality of storage virtualization service 310, for example via one or more APIs 302, to access data from and store data to a virtual data store 316 provided by the provider network 300. In some embodiments, a virtualized data store gateway (not shown) may be provided at the client network 350 that may locally cache at least some data, for example frequently accessed or critical data, and that may communicate with virtualized data store service 310 via one or more communications channels to upload new or modified data from a local cache so that the primary store of data (virtualized data store 316) is maintained. In at least some embodiments, a user, via a virtual computing system 392 and/or on another client device 390, may mount and access one or more storage volumes 318 of virtual data store 316, each of which appears to the user as local virtualized storage 398.

While not shown in FIG. 3, the virtualization service(s) may also be accessed from resource instances within the provider network 300 via API(s) 302. For example, a client, appliance service provider, or other entity may access a virtualization service from within a respective private network on the provider network 300 via an API 302 to request allocation of one or more resource instances within the private network or within another private network. Note that in some embodiments, the hardware virtualization service 320 may be configured to provide computation resources 324 that have been configured to implement a virtual desktop instance, which may appear to the user as a local desktop (implemented by a virtual computing system 392). Note also that in some embodiments, the computation resources 324 that are made available to the client via hardware virtualization service 320 may include multiple network interfaces. For example, some of them may include one network interface for communicating with various components of client network 350 and another network interface for communicating with computation resources or other network entities on another network that is external to provider network 200 (not shown).

In some embodiments, various components of a service provider network may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given while using the virtual desktop instance. In some embodiments, this may include one or more desktop applications that are packaged as virtualized application packages and that are provided on-demand through an application fulfillment platform implemented on resources of the service provider network. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 4:
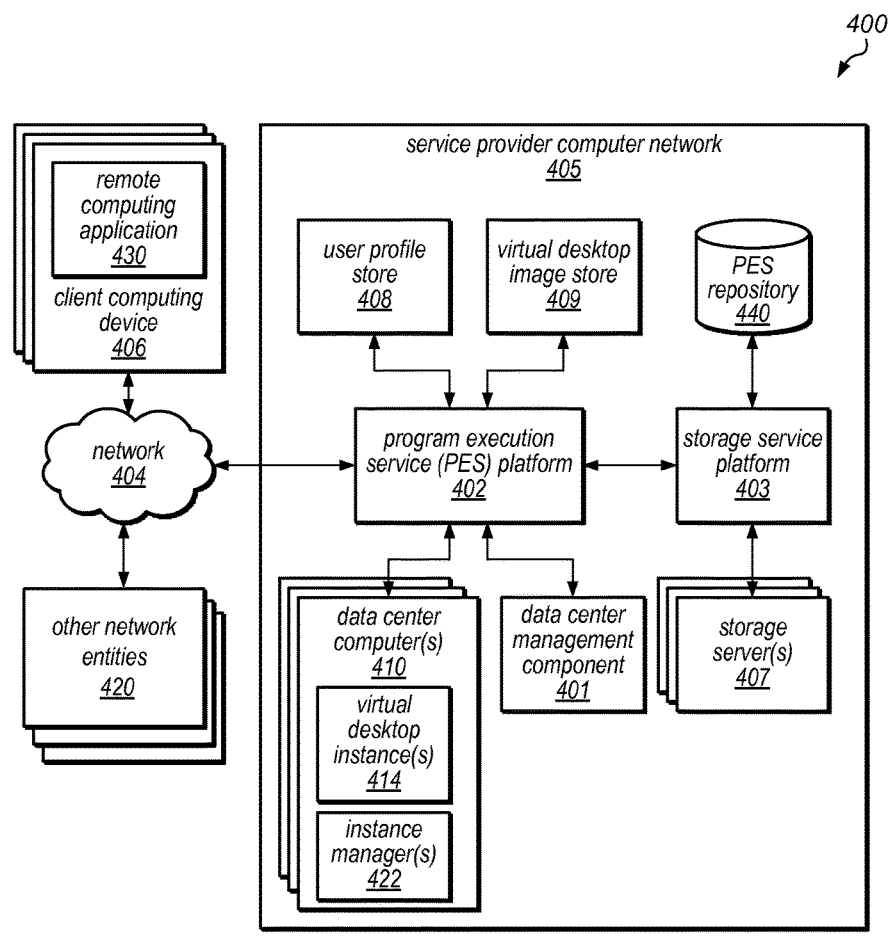
FIG. 4 is a block diagram illustrating a networked computing environment that includes a client computing device in communication with a service provider computer network, according to at least some embodiments.

FIG. 4 is a block diagram illustrating an example networked computing environment 400 that includes a client computing device 406 in communication with a service provider computer network 405 via the communication network 404. The client computing device 406 may be used for providing access to a remote operating system and applications to a user. In various embodiments, the client computing device 406 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 406 includes necessary hardware and software components for establishing communications over a communication network 404, such as a wide area network or local area network. For example, the client computing device 406 may be equipped with networking equipment and browser software applications that facilitate communications via the Internet or an intranet. The client computing device 406 may have varied local computing resources such as central processing units and architectures, memory, mass storage, graphics processing units, communication network availability and bandwidth, etc.

In one embodiment, the client computing device 406 may run a remote computing application 430. The remote computing application 430 may request access to a virtual desktop instance hosted by the service provider computer network 405. The remote computing application 430 may also manage the remote computing session between the client computing device 406 and the service provider computer network 405. As illustrated in FIG. 4, the service provider computer network 405 may also include a PES platform 402. The PES platform 402 illustrated in FIG. 4 corresponds to a logical association of one or more data centers associated with a service provider. The PES platform 402 may be associated with a number of data center computers, such as, for example, data center computers 410. Each data center computer 410 may host one or more virtual desktop instances 414. For example, the data center computer 410 may host a virtual desktop instance by executing a virtual machine on a physical device. The virtual machine may execute an instance of an operating system and application software to create a virtual desktop instance. Each virtual desktop instance executed by the PES 402 may be accessed by one or more client computing devices, such as client computing device 406.

In some embodiments, data center computers 410 may be associated with private network addresses, such as IP addresses, within the service provider computer network 405 such that they may not be directly accessible by the client computing devices 406. The virtual desktop instances 414 may be associated with public network addresses that may be made available by a gateway at the edge of the service provider computer network 405. Accordingly, the virtual desktop instances 414 may be directly addressable by client computing devices 406 via the public network addresses. One skilled in the relevant art will appreciate that each data center computer 410 would include physical computing device resources and software to execute the multiple virtual desktop instances 414 or to dynamically instantiate virtual desktop instances 414. Such instantiations can be based on a specific request, such as from the client computing device 406.

As illustrated in FIG. 4, the data center computers 410 may include one or more instance managers 422. The instance managers 422 may be on the same computer as the respective instances 414, or on a separate computer. The instance managers 422 may track progress of the instances executed on the data center computers 410, monitor and coordinate the storage of data created by the user while interacting with the instances 414 via the client computing devices, and monitor the overall health and state of the data center computers 410 and of the remote computing applications running on the client computing devices 406. The instance managers 422 may communicate information collected through tracking and monitoring with the data center management component 401 of the PES platform 402 in order to efficiently manage the various remote computing sessions between the data center computers 410 and the client computing devices 406.

As illustrated in FIG. 4, the service provider network 405 may also include a storage service platform 403. The storage service platform 403 may include, or be connected to, one or more storage servers 407. The storage servers 407 may be used for storing data generated or utilized by the virtual desktop instances 414. The data generated or utilized by the virtual desktop instances 414 may be based on the interaction between the client computing devices 406 and the PES 402 via one or more remote computing sessions.

In some embodiments, the storage service platform 403 may logically organize and maintain information associated with a hosted virtual desktop instance 414 in a desktop store. The information associated with a virtual desktop instance 414 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 405 may be able to mitigate the effect of failures of the data center computer(s) 410 running the virtual desktop instances 414 or errors associated with the execution of virtual desktop instances 414 on the data center computer(s) 410 by storing data on storage servers independent from the data center computers 410. Additionally, the service provider network 405 may also facilitate client interaction with multiple virtual desktop instances 414 by maintaining the information in the desktop stores. In some embodiments, if one virtual desktop instance 414 fails, a new instance may be launched and attached to the same desktop store that was previously attached to the virtual desktop instance 414 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 414 loses its connection to the desktop store, the PES 402 may switch the connection of the virtual desktop instance 414 from the desktop store to the back-up desktop store.

As illustrated in FIG. 4, the PES platform 402 may also include a central storage device such as a PES repository 440 for storing data stored by the various desktop stores and backup stores on storage servers 407. The data center computers 410 and the storage servers 407 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 405 may include a user profile store 408. The user profile store 408 may be used to store, for example, various programs a user is given access to while using a virtual desktop instance 414. In some embodiments, this may include one or more desktop applications that are packaged as virtualized application packages and that are provided on-demand through an application fulfillment platform implemented on resources of the service provider network 405. The user profiles stored may also indicate a maximum time or cost associated with the remote computing sessions of different users. The PES platform 402 may take user profiles into consideration when placing, configuring, and/or managing virtual desktop instances 414. The PES platform 402 may also include, or be connected to, a virtual desktop image store 409. The virtual desktop image store 409 may include template images of operating systems without customizations applied per user profiles.

In some embodiments, data center computers 410 and storage servers 407 may be considered to be logically grouped, regardless of whether the components, or portions of the components, are physically separate. For example, a service provider computer network 405 may maintain separate locations for providing the virtual desktop instances 414 and the storage components. Additionally, although the data center computers 410 are illustrated in FIG. 4 as logically associated with a PES platform 402, the data center computers 410 may be geographically distributed in a manner to best serve various demographics of its users. Additionally, one skilled in the relevant art will appreciate that the service provider computer network 405 may be associated with various additional computing resources, such additional computing devices for administration of content and resources, and the like. For example, the service provider computer network 405 (and/or various ones of the virtual desktop instances 414 implemented thereon) may be configured to communicate with other network entities 420 over communication network 404 or over another communication network (e.g., at least some of the virtual desktop instances 414 may include a network interface usable to access one or more other network entities 420 that is separate and distinct from to a network interface that is usable to communicate with client computing device 406). These other network entities 420 may include, for example, other client networks or computing devices thereof, computing systems that provide resources for servicing requests received from client computing device 406, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 430. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may wish to have access. In some cases, the determination may be made on historical usage data of a user, which the PES platform 402 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 4 above. In some embodiments, the remote computing application 430 may request that a virtual desktop session be opened on behalf of the client, in response to which a virtual desktop instance 414 may be instantiated, configured for the use of the client, and/or connected to the client computing device 406 over network 404 (e.g., via a network interface of the virtual desktop instance 414).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are. An example use of overlay network technology is illustrated in FIG. 5 and described in detail below.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets may be encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, may encapsulate or tag the client packet according to an overlay network (or IP tunneling) protocol and send the encapsulated packet onto the overlay network for delivery. The encapsulated packet may then be routed to another VMM via the overlay network according to the IP tunneling technology. The other VMM may strip the overlay network encapsulation from the packet and deliver the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

FIG. 5 illustrates an example data center (e.g., one that implements an overlay network on a network substrate using IP tunneling technology), according to at least some embodiments. In some embodiments, such a data center may include an application fulfillment platform that is configured to provide on-demand delivery of desktop applications to desktops on physical computing devices and/or virtual desktops, as described herein. As illustrated in this example, a provider data center 500 may include a network substrate that includes networking devices 512 such as routers, switches, network address translators (NATs), and so on. At least some embodiments may employ an Internet Protocol (IP) tunneling technology to provide an overlay network via which encapsulated packets may be passed through network substrate 510 using tunnels. The IP tunneling technology may provide a mapping and encapsulating system for creating an overlay network on a network (e.g., a local network in data center 500 of FIG. 5) and may provide a separate namespace for the overlay layer (the public IP addresses) and the network substrate 510 layer (the private IP addresses). Packets in the overlay layer may be checked against a mapping directory (e.g., provided by mapping service 530) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 530) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 5, an example overlay network tunnel 534A from a virtual machine (VM) 524A on host 520A to a device on the intermediate network 540 (e.g., a computing system 570, a computing system 552 on local network 550, or a data center 560, and an example overlay network tunnel 534B between a VM 524B on host 520B and a VM 524A on host 520A are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

At least some networks in which embodiments of the techniques described herein for providing on-demand delivery of desktop applications to virtual desktops in a cloud computing environment may include hardware virtualization technology that enables multiple operating systems to run concurrently on a host computer (e.g., hosts 520A and 520B of FIG. 5), i.e. as virtual machines (VMs) 524 on the hosts 520. The VMs 524 (some of which may be configured to implement a virtual desktop instance for the use of a client) may, for example, be rented or leased to clients of a network provider. A hypervisor, or virtual machine monitor (VMM) 522, on a host 520 may serve as an instance manager for the VMs 524 and/or other virtualized resource instances on the hosts 520, which may include presenting the VMs 524 on the host with a virtual platform and monitoring the execution of the VMs 524. Each VM 524 may be provided with one or more private IP addresses; the VMM 522 on a host 520 may be aware of the private IP addresses of the VMs 524 on the host. A mapping service 530 may be aware of all network IP prefixes and the IP addresses of routers or other devices serving IP addresses on the local network. This includes the IP addresses of the VMMs 522 serving multiple VMs 524. The mapping service 530 may be centralized, for example on a server system, or alternatively may be distributed among two or more server systems or other devices on the network. A network may, for example, use the mapping service technology and IP tunneling technology to, for example, route data packets between VMs 524 on different hosts 520 within the data center 500 network; note that an interior gateway protocol (IGP) may be used to exchange routing information within such a local network.

In addition, a network such as the provider data center 500 network (which is sometimes referred to as an autonomous system (AS)) may use the mapping service technology, IP tunneling technology, and routing service technology to route packets from the VMs 524 to Internet destinations, and from Internet sources to the VMs 524. Note that an external gateway protocol (EGP) or border gateway protocol (BGP) is typically used for Internet routing between sources and destinations on the Internet. FIG. 5 shows an example provider data center 500 implementing a network that provides resource virtualization technology and that provides full Internet access via edge router(s) 514 that connect to Internet transit providers, according to at least some embodiments. The provider data center 500 may, for example, provide clients the ability to implement virtual computing systems (VMs 524) via a hardware virtualization service (such as hardware virtualization service 320 in FIG. 3) and the ability to implement virtualized data stores 516 on storage resources 518 via a storage virtualization service (such as storage virtualization service 310 in FIG. 3).

In some embodiments, the data center 500 network may implement IP tunneling technology, mapping service technology, and a routing service technology to route traffic to and from virtualized resources, for example to route packets from the VMs 524 on hosts 520 in data center 500 to Internet destinations, and from Internet sources to the VMs 524. Internet sources and destinations may, for example, include computing systems 570 connected to the intermediate network 540 and computing systems 552 connected to local networks 550 that connect to the intermediate network 540 (e.g., via edge router(s) 514 that connect the network 550 to Internet transit providers). The provider data center 500 network may also route packets between resources in data center 500, for example from a VM 524 on a host 520 in data center 500 to other VMs 524 on the same host or on other hosts 520 in data center 500. In some embodiments, at least some of the VMs 524 may include two or more network interfaces. For example, they may include one network interface usable for communications between VMs 524 and the clients on whose behalf VMs 524 are hosted by the provider and a second (separate and distinct) network interface that is usable to access external resources, computing systems, data centers, or Internet destinations on networks other than the provider network and the client network, either or both of which may employ an IP tunneling technology, as described herein. In other embodiments, each of the VMs 524 may include only a single network interface.

A service provider that provides data center 500 may also provide additional data center(s) 560 that include hardware virtualization technology similar to data center 500 and that may also be connected to intermediate network 540. Packets may be forwarded from data center 500 to other data centers 560, for example from a VM 524 on a host 520 in data center 500 to another VM on another host in another, similar data center 560, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 518, as virtualized resources to clients of a network provider in a similar manner.

Note that a public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network, or between a provider network and other network entities (e.g., external resources, computing systems, data centers, or Internet destinations on networks other than the provider network and the client network on whose behalf VMs 524 are hosted by the provider).

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of desktop applications (e.g., as virtualized application packages) to virtual desktop instances, as described herein.

In some embodiments, these virtual desktop instances may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credentials presented by the user upon logging into the virtual desktop instance have been authenticated.

In some embodiments, the application fulfillment platforms described herein may provide streamlined application distribution to the end users of a service provider customer. They may provide a fully managed service that improves efficiency and simplify administration with no infrastructure required at the customer. Through these platforms, applications may be deployed on-demand and at scale while maintaining centralized control, security and compliance from an easy-to use management console. The platforms may implement a simple process for subscription set-up that enables quick deployment of applications without on-premise infrastructure, and may allow administrators to control access to applications with granular access policy enforcement on a per user basis. In some embodiments, the application fulfillment platforms described herein may enable a service provider to handle application lifecycle management (specifically around installation, upgrades and patch management) on behalf of its customers.

As described herein, the application fulfillment platforms described herein may deploy virtualized applications as isolated containers and provide user access to their applications on any authorized device without performing application installs. The application virtualization techniques employed by the application fulfillment platforms may allow applications and application data to be moved from one virtual desktop instance to another, and may allow multiple generations and/or versions of the same application to run concurrently on a single virtual desktop instance as long as there is operating system support. They may also allow legacy applications to be executed in a virtualized environment.

In some embodiments, the application fulfillment platforms described herein may support a pay-as-you-go model in which, for example, customers are billed on a per user per month basis only for the applications they use, and in which an unlimited number of a customer's own line-of-business applications may be deployed to its end users, along with any applications for which the customer has procured licenses from the service provider or an application vendor. The platforms may also allow customers to track and manage application spending with detailed application and license usage reporting on a per application basis. In addition they may allow customers to minimize up-front capital investment by using on-demand subscriptions. In some embodiments, application fulfillment platforms described herein may improve end user productivity by providing self-service access to curated applications on-demand.

Virtual Desktop Access Using Device-Native User Interfaces

Figure 6:
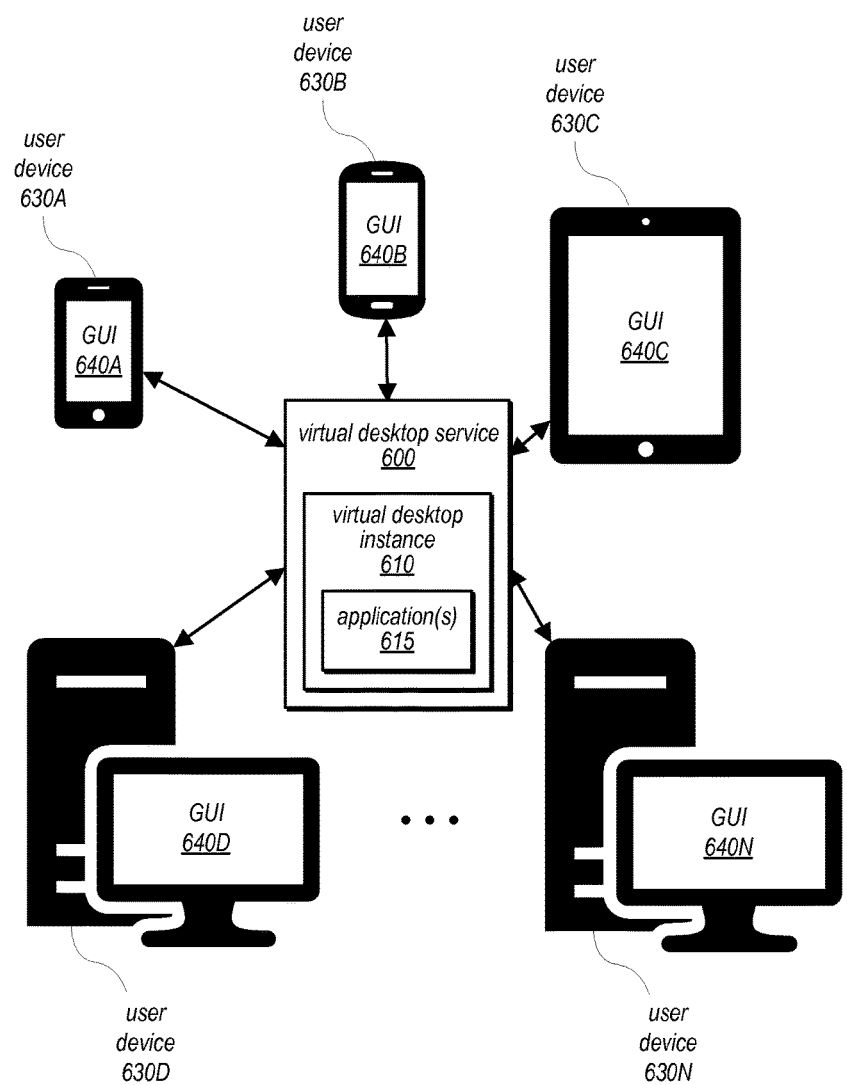
FIG. 6 is a block diagram illustrating a virtual desktop service that provides virtual desktop access using device-native user interfaces, according to one embodiment.

As noted above, in at least some embodiments, a service provider system may include an application fulfillment platform that is configured to provide on-demand delivery of applications (e.g., as virtualized application packages) to end users of service provider customers. In such a service provider system that provides virtualized computing resources to clients, a virtual desktop service may provide virtual desktop instances with applications (e.g., desktop applications) to clients. FIG. 6 is a block diagram illustrating a virtual desktop service 600 that provides virtual desktop access using device-native user interfaces, according to one embodiment. A virtual desktop instance 610 may be implemented on behalf of a given end user or for multiple collaborating end users. A service provider network may include a plurality of computing nodes (for example, computing devices as shown in FIG. 12) that collectively provide the virtual desktop service 600 to one or more clients of the provider network. The provider network may implement a virtualized computing resource instance executing on one of the computing nodes, and the virtualized computing resource instance may implement the virtual desktop instance 610 as discussed above with respect to FIG. 1 through FIG. 5. One or more applications 615 may be installed on the virtual desktop instance 610 and executed using the virtualized computing resource instance. The virtual desktop service 600 may maintain the virtual desktop, e.g., by maintaining data such as configuration data and application data usable to generate a graphical user interface (GUI) for the virtual desktop instance and run the application(s). The virtual desktop may include a graphical depiction of a set of resources associated with the virtual desktop instance (e.g., one or more graphical indicators of applications, one or more windows associated with applications, one or more interface elements for browsing files or folders, one or more interface elements for browsing available applications or switching running applications, and so on).

A given end user may operate heterogeneous user devices (such as user devices 630A, 630B, 630C, and 630D through 630N) that connect to the same virtual desktop instance 610. The user devices 630A-630N may include, for example, mobile devices such as smartphones and tablets, desktop computers, laptop computers, wearable devices, home automation devices, and any other suitable computing devices. For example, at one or more points in time, the same user may access the virtual desktop instance 610 with a smartphone 630A, a different type of smartphone 630B (e.g., running a different mobile operating system (OS)), a tablet device 640C (e.g., running the same or different mobile OS as the devices 630A or 630B), a desktop computer 630D (running a desktop OS), and another desktop computer 630N (e.g., running a different desktop OS). Using the techniques described herein for virtual desktop access using device-native user interfaces, any of the devices 630A-630N may present a graphical user interface (GUI) for the virtual desktop instance 610 on a display associated with the corresponding device. In the example of FIG. 6, the user device 630A may display a GUI 640A on an integrated display, the user device 630B may display a GUI 640B on an integrated display, the user device 630C may display a GUI 640C on an integrated display, the user device 630D may display a GUI 640D on an attached display, and the user device 630N may display a GUI 640A on an attached display.

The user devices may be operated by a single user and/or accessible to a single user account associated with the virtual desktop instance (e.g., all the devices may have suitable access credentials for the virtual desktop instance). At least some of the user devices may be heterogeneous, such that the devices may implement different device platforms. As used herein, the term "device platform" generally includes a combination of operating system software and device hardware. Devices with different device platforms may run different families of operating systems. Devices with different device platforms may be based on different hardware platforms or different families of computing hardware, such as different families of central processing units (CPUs). The different device platforms may differ in the native appearance of their GUIs and/or interaction capabilities (e.g., in the type of user input hardware they include or support). The device platforms may differ in terms of their native GUI appearance as exemplified by the OS of the device platform, e.g., for windows, files, folders, application icons, typefaces, color schemes, layout, and so on. The device platforms may differ in terms of their interaction capability, e.g., on the available input modalities such as mouse or trackpad input, keyboard input, speech input, touchscreen input, thermometer input, accelerometer input, and so on.

Typically, each of the user devices may have an associated display, e.g., an integrated display on a mobile device or laptop computer, to which the device can display graphical output. The displays associated with the user devices may also have different characteristics, such as different dimensions (e.g., in terms of pixels), different physical sizes, different color depths, and/or the presence or absence of touchscreen input capability. Using the techniques described herein, a uniform interface to a single virtual desktop instance 610 may be provided to the heterogeneous user devices, and each of the user devices 630A-630N may (in parallel) render and display a GUI for the virtual desktop that emulates the native appearance and interaction capability of the device platform. Accordingly, the various GUIs for the virtual desktop instance may vary from user device to user device in a manner that generally preserves the "look and feel" of other software (such as operating system software) on the devices.

Figure 7:
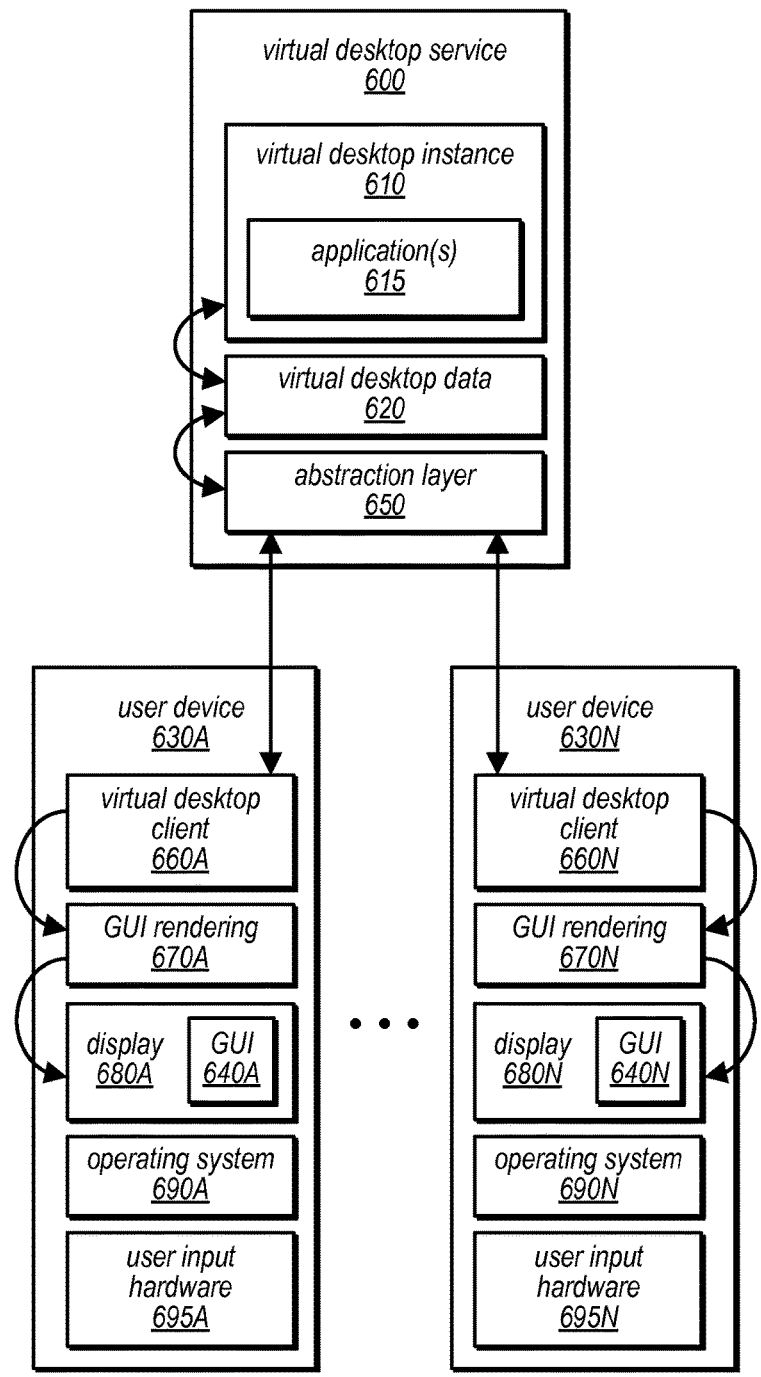
FIG. 7 is a block diagram illustrating further aspects of the virtual desktop service that provides virtual desktop access using device-native user interfaces, including an abstraction layer that provides a uniform interface to heterogeneous user devices, according to one embodiment.

FIG. 7 is a block diagram illustrating further aspects of the virtual desktop service that provides virtual desktop access using device-native user interfaces, including an abstraction layer that provides a uniform interface to heterogeneous user devices, according to one embodiment. The virtual desktop service 600 may include an abstraction layer 650 that presents a substantially uniform interface to the virtual desktop instance 610 to heterogeneous user devices 630A-630N. The abstraction layer 650 may also be referred to as a bridge or bridge layer. Any suitable computing resources of a provider network, including virtual and/or physical computing and storage instances, may be used to implement the abstraction layer 650. The abstraction layer 650 may comprise one or more application programming interfaces (APIs) or other programmatic interfaces that enable user devices 630A-630N to make calls or requests to the virtual desktop service 600. For example, the abstraction layer 650 may permit user devices 630A-630N to request a connection to the virtual desktop instance 610 (and, if approved based on suitable access credentials, become connected to the instance) and request data usable to generate a GUI for the virtual desktop instance. As another example, the abstraction layer 650 may respond to calls from user devices to determine the application running in the topmost window or the current position of the cursor. The abstraction layer 650 may also send data to connected user devices, either with or without prompting from the devices.

The virtual desktop service 600 may store data 620 associated with the virtual desktop instance 610. The data 620 may include any of the data in the virtual desktop image store 409 as discussed with reference to FIG. 4. For example, the data 620 may include configuration data for the virtual desktop instance (e.g., an indication of installed and available applications, an indication of executing applications, a state of the windows and other interface elements on the virtual desktop, and so on) as well as data associated with the applications 615 themselves. The data 620 may remain consistent despite any differences in how elements of that data are displayed on difference devices. The virtual desktop service 600 may retrieve, repackage, and/or otherwise transform elements of the stored data 620 to be sent to the user devices 630A-630N using the abstraction layer 650. The data sent to the devices may include, for example, an indication of available applications 615, an indication of applications 615 that are currently open and/or executing, an indication of windows that are open on the virtual desktop instance 610, an indication of folders and/or files that are browsable, and/or any other data suitable for generating a GUI for the virtual desktop instance. The data sent to the devices may be packaged as one or more objects or other logical representations and may not include rendered pixels (with the potential exception of any pre-rendered icons or other graphical elements, e.g., icons representing applications or folders).

Each of the user devices 630A-630N may include a virtual desktop client, such as virtual desktop client 660A for device 630A and virtual desktop client 660N for device 630N. The data from the virtual desktop service 600 may be received and processed by the virtual desktop client on the corresponding device, e.g., through the abstraction layer 650 that provides a uniform interface to different types of user devices. The implementation of the virtual desktop clients 660A-660N may vary from user device to user device, but at least some of the functionality of the clients may be similar across different user devices. In one embodiment, the data associated with the virtual desktop instance 610 may sent to the user devices 630A-630N in response to the one or more calls received (e.g., by the abstraction layer 650) from the client software 660A-660N on the devices. For example, the calls may represent queries for the windows or other interface elements to display in a GUI for the virtual desktop instance 610.

The user devices 630A-630N may implement different device platforms and may differ from one another in ways that potentially affect the presentation of a GUI to the virtual desktop instance 610 and/or the receipt of user input for the virtual desktop instance. Each of the user devices may run operating system software, such as operating system 690A for device 630A and operating system 690N for device 630N. The operating systems may vary across the different devices 630A-630N. For example, the user device 630A may be a smartphone running a mobile operating system (OS) (e.g., iOS® or Android®) while the user device 630N may be a desktop computer running a different operating system (e.g., OS X®, Windows®, or Linux®). The user devices may also differ in terms of their interaction capability, e.g., on the available input modalities such as mouse or trackpad input, keyboard input, speech input, touchscreen input, thermometer input, accelerometer input, global positioning input, other sensor data, and so on. Each of the user devices may include user input hardware (and suitable operating system software for handling the input), such as user input hardware 695A for device 630A and user input hardware 690N for device 630N. The user input hardware may vary across the different devices 630A-630N. For example, the user device 630A may be a smartphone with touchscreen input but no attached mouse or trackpad while the user device 630N may be a desktop computer with a mouse and keyboard but no touchscreen capability. Each of the user devices may have an associated display, such as display 680A for device 630A and display 680N for device 630N, to which the device can display graphical output. The displays associated with the user devices may also have different characteristics, such as different dimensions (e.g., in terms of pixels), different physical sizes, different color depths, and/or the presence or absence of touchscreen input capability.

Each of the devices may also include a component for GUI rendering, such as GUI rendering 670A for device 630A and GUI rendering 670N for device 630N. The GUI rendering components may render all or part of a GUI for the corresponding device based (at least in part) on the data received from the virtual desktop service 600. Rendering the GUI may include generating pixel data for display on a display device, e.g., based on non-pixel data. The GUI rendering components may interact with the local OS, e.g., by making calls to the OS to generate GUI elements. The various GUIs for the virtual desktop instance 610 may vary from user device to user device in a manner that generally preserves the "look and feel" of other software (such as operating system software) on the devices. For example, the GUI 640A may emulate or mimic a native appearance and/or interaction capability of the device platform of the user device 630A, and the GUI 640N may emulate or mimic a native appearance and/or interaction capability of the device platform of the user device 630N.

The GUI 640A may differ (at least in part) from the GUI 640N. For example, the display 680N may be substantially larger (in terms of physical dimensions) than the display 680A, and so a greater amount of virtual desktop data may be displayed in the GUI 640N than in the GUI 640A. In one embodiment, the GUI 640A may display a first subset of information displayed in the other GUI 640N and hide a second subset of information displayed in the other GUI 640N, e.g., by stacking windows on top of one another due to a reduced display size. Similarly, the GUI 640A may comprise a different layout than the other GUI 640N. In one embodiment, the GUI 640A may represent a single-application mode in which a window for a single application 615 consumes most or all of the display 680A. The contents of the single window may be rendered on the user device 630A (e.g., using objects or other logical data provided by the virtual desktop service 600) or rendered by the virtual desktop service and streamed to the device. In contrast, the other GUI 640N may display additional interface elements other than the single window, including elements associated with an OS (e.g., windows for browsing files, folders, and/or available applications) for the virtual desktop instance 610 and/or windows corresponding to other ones of the applications 615.

As another example, the device 630N may include a mouse or trackpad input device but not a touchscreen display while the device 630A (e.g., a touch-capable mobile device) may not include a mouse or trackpad, and so the GUI 640N may be tailored for mouse or trackpad input while the GUI 640A may be tailored for touchscreen input. Any of the GUIs 640A-640N may be displayed simultaneously on the corresponding user devices 630A-630N. In one embodiment, both user devices may access the virtual desktop instance in parallel.

In one embodiment, data associated with the virtual desktop instance 610 may be modified for any of the devices 630A-630N using the abstraction layer 650. For example, the device 630A may issue one or more calls (e.g., using the virtual desktop client 660A) to the abstraction layer in order to receive data usable for rendering the GUI 640A. In response to the call(s), the abstraction layer may transform or otherwise modify elements of the virtual desktop data 620 and provide the modified data to the device 630A. The modified data may include one or more modifications to an appearance of the virtual desktop interface so that at least a portion of the GUI 640A emulates an appearance and interaction capability of the particular device platform of the user device 630A. For example, the modified data may include a different set of windows to be displayed, a different layout or arrangement of windows, one or more reduced or iconized versions of particular windows, or other substantive or visual modifications based on limitations of the device 630A. In this manner, the abstraction layer 650 may modify elements of the data 620 in different ways for different ones of the user devices 630A-630N.

In one embodiment, rather than using an abstraction layer 650 to a single virtual desktop instance 610, the virtual desktop service 600 may create multiple virtual desktop instances that run in parallel (e.g., using one or more virtual computing instances). Each of the virtual desktop instances may be dedicated to one of the user devices 630A-630N. Each of the virtual desktop instances may vary in terms of layout, display dimensions, and so on, based on the characteristics of the corresponding user device. However, all of the virtual desktop instances may draw from the same set of virtual desktop data 620, and changes to the data 620 (e.g., as entered using one of the user devices) may be pushed to all of the virtual desktop instances and then to the GUIs on the user devices.

Figure 8:
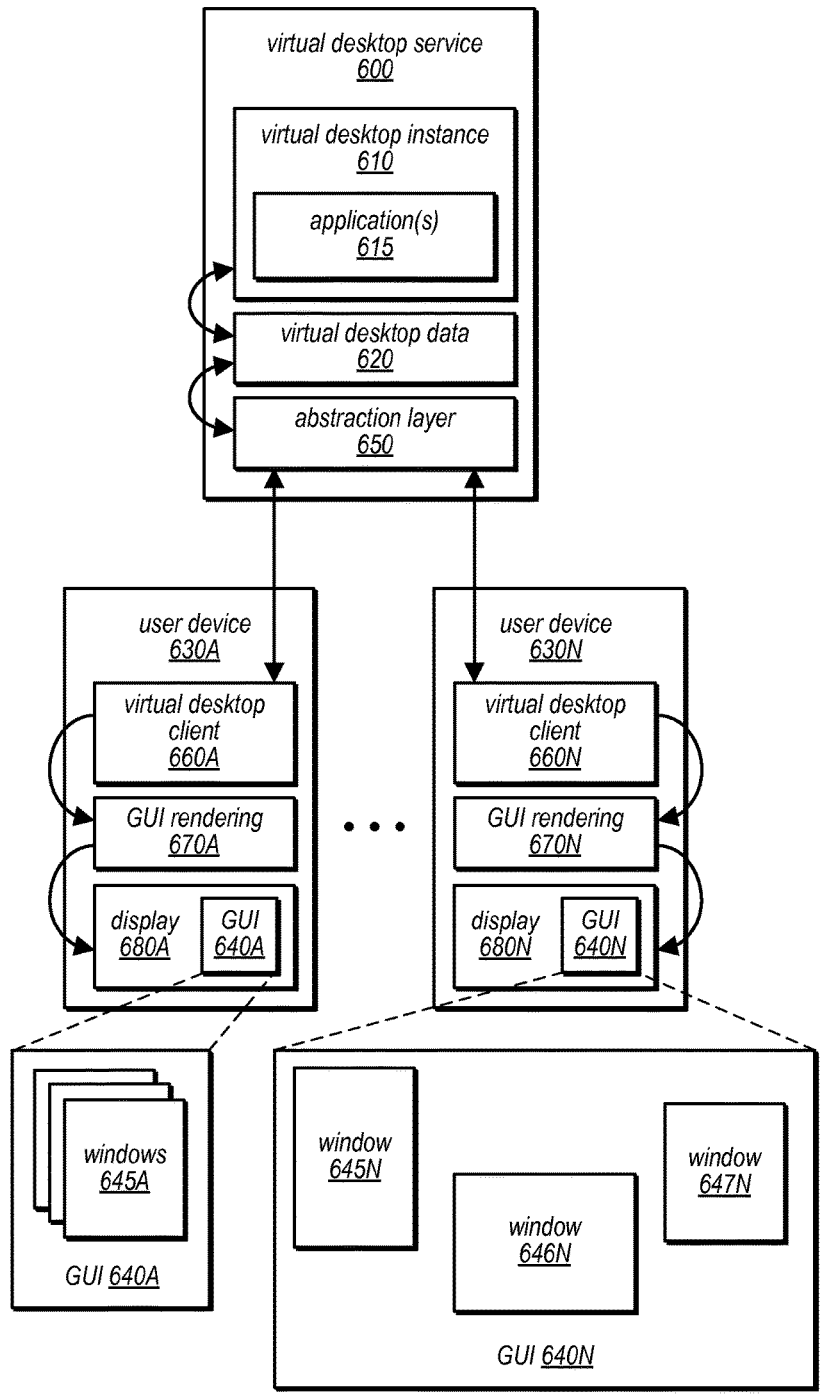
FIG. 8 is a block diagram illustrating further aspects of the virtual desktop service that provides virtual desktop access using device-native user interfaces, including examples of different graphical user interfaces (GUIs) for heterogeneous user devices having different display capabilities, according to one embodiment.

FIG. 8 is a block diagram illustrating further aspects of the virtual desktop service that provides virtual desktop access using device-native user interfaces, including examples of different graphical user interfaces (GUIs) for heterogeneous user devices having different display capabilities, according to one embodiment. The various GUIs for the virtual desktop instance 610 may vary from user device to user device based (at least in part) on the characteristics of the displays associated with the devices. For example, the display 680N may be substantially larger (in terms of physical dimensions) than the display 680A, and so a greater amount of virtual desktop data may be displayed in the GUI 640N than in the GUI 640A. As shown in the example of FIG. 8, the virtual desktop may include a set of windows 645A at a particular point in time. The windows 645A may include application windows and/or OS windows (e.g., file browser windows). Due to the differences in display size between the display 680A and the display 680N, a greater amount of information may be shown in the larger display 680N than in the smaller display 680A. For example, in the smaller GUI 640A, the windows 645A may be depicted as a stack or in an accordion-style display which the user can flip or swipe through using suitable gestures on a touchscreen. However, the same windows may be spaced out and depicted individually as windows 645N, 646N, and 647N on the more spacious GUI 640N. The stacked windows 645A and individual windows 645N-647N may represent the same virtual desktop data supplied by the abstraction layer 650, but the GUIs 640A and 640N may be rendered differently based on device characteristics. The differences between the GUI 640A and the GUI 640N may be based (at least in part) on differing device limitations, including memory limitations and OS-based limitations on the amount or type of data that can be displayed at a given time. For example, if the OS 690A for the user device 630A permits a maximum of N windows to be displayed at a given time, then the GUI 640A may be generated to respect this restriction; additional windows beyond N may be hidden or accessible in another manner, e.g., through an iconized version, drop-down menu, or other list.

Figure 9A:
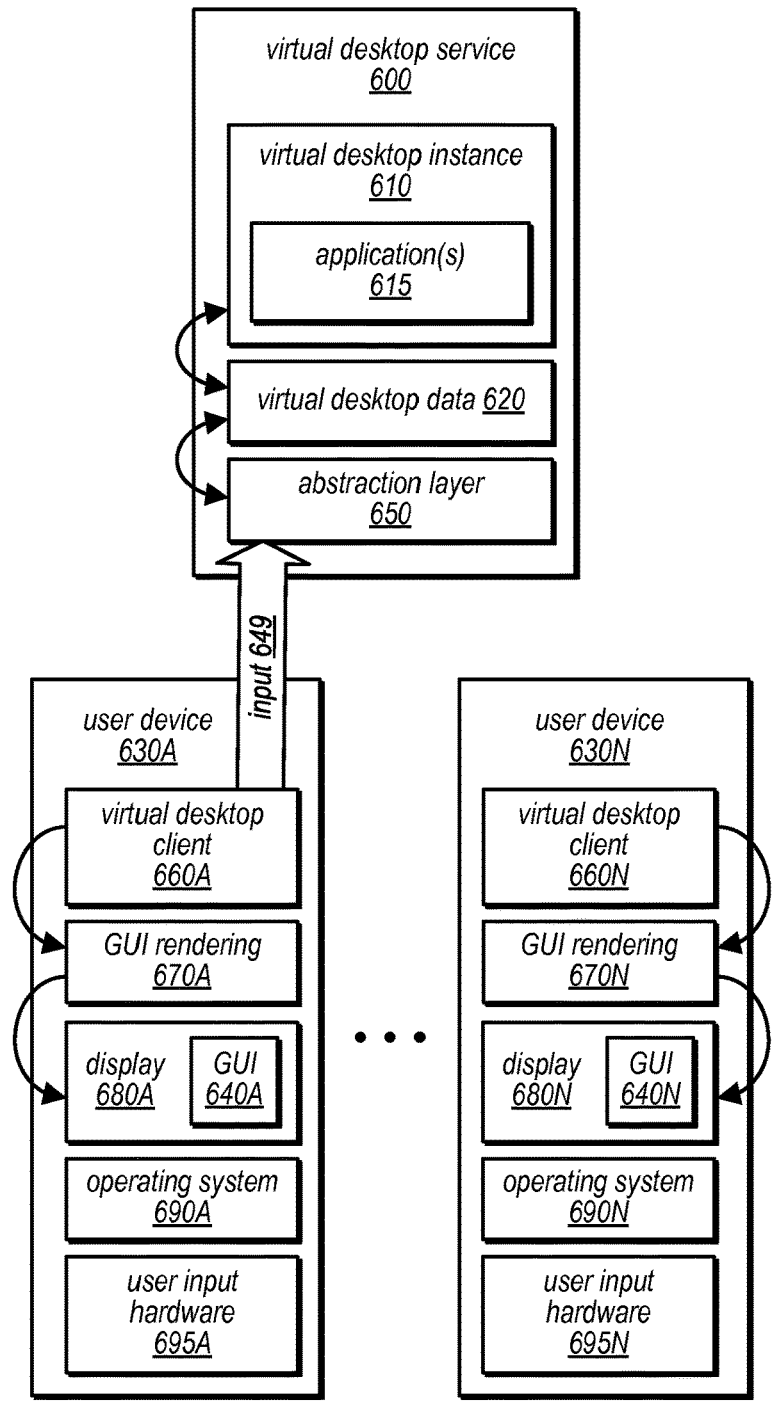
FIG. 9A and FIG. 9B are block diagrams illustrating further aspects of the virtual desktop service that provides virtual desktop access using device-native user interfaces, including the publishing of virtual desktop data updates to user devices, according to one embodiment.
Figure 9B:
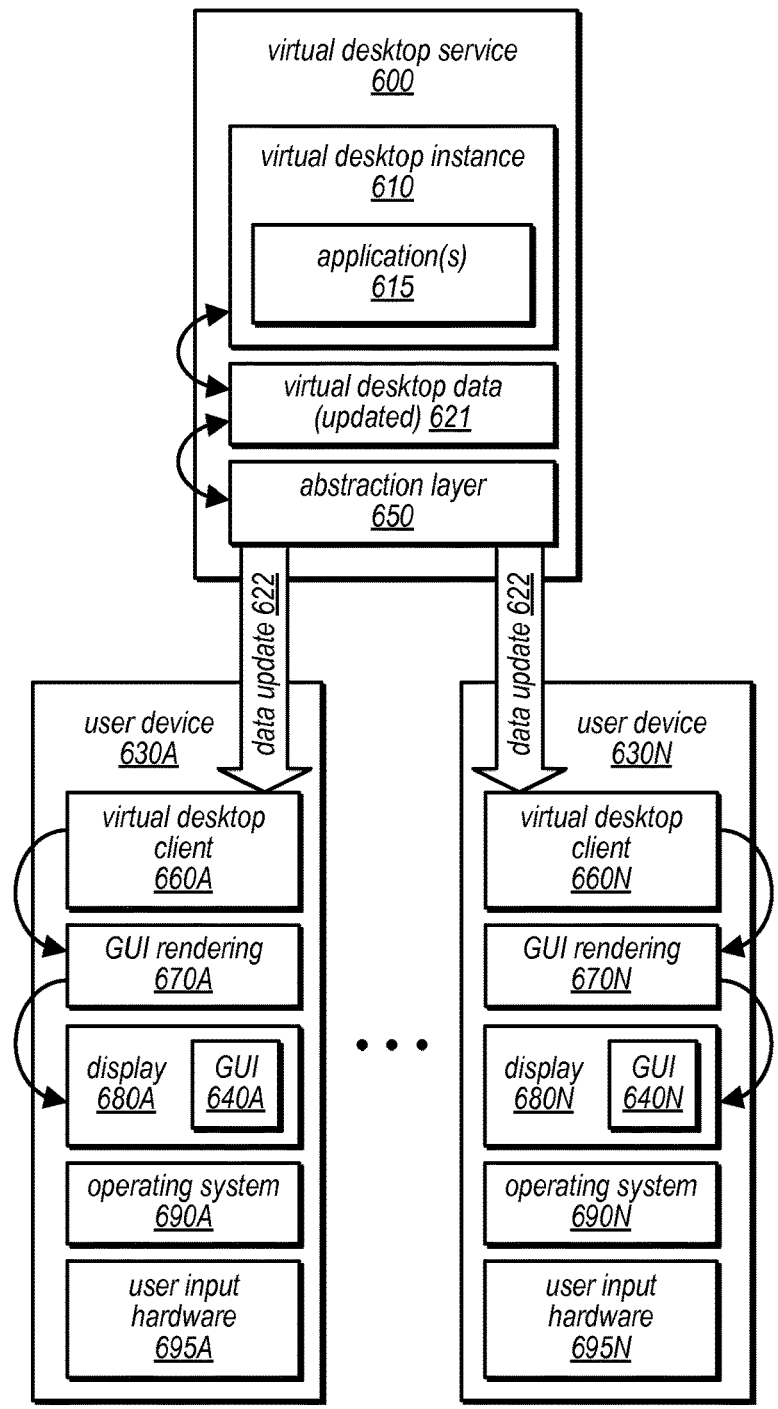

FIG. 9A and FIG. 9B are block diagrams illustrating further aspects of the virtual desktop service that provides virtual desktop access using device-native user interfaces, including the publishing of virtual desktop data updates to user devices, according to one embodiment. In one embodiment, updates to the virtual desktop instance 610 may be published or otherwise pushed to connected user devices 630A-630N. As shown in FIG. 9A, input 649 for the virtual desktop instance 610 may be received from one of the user devices, such as device 630A, connected to the virtual desktop instance. Data 620 associated with the virtual desktop instance 610 may be updated based (at least in part) on the input 649. For example, the input 649 may represent a change to the topmost window of a set of windows or another reconfiguration of windows on the virtual desktop. As another example, the input 649 may represent a change to data in an application window.

In one embodiment, the input 649 may represent computational input or sensor input (e.g., global positioning input, accelerometer input, thermometer input, and so on) and not necessarily user input. For example, individual ones of the user devices 630A-630N may collaborate to provide computational or sensor input which is aggregated using the virtual desktop instance 610. Individual ones of the user devices 630A-630N may be selected for the collaborative computation based on their particular capabilities or features. For example, if the user device 630N includes a specialized processor such as a graphics processing unit (GPU), then that device may be selected by the virtual desktop service 600 to provide GPU output based on input supplied by the virtual desktop instance 610.

As shown in FIG. 9B, at least a portion of the updated data 622 associated with the virtual desktop instance may be sent to all the connected user devices 630A-630N. In one embodiment, the data update 622 may be sent to the user devices without the need for the devices to request updates; in another embodiment, user devices may poll the virtual desktop service for updates. The updated data 622 may include, for example, an indication of available applications, an indication of applications that are currently open and/or executing, an indication of windows that are open on the virtual desktop instance, an indication of folders and/or files that are browsable, and/or any other data suitable for generating a GUI for the virtual desktop instance. The updated data 622 may be packaged as one or more objects or other logical representations and may not include rendered pixels (with the potential exception of any pre-rendered icons or other graphical elements, e.g., icons representing applications or folders). The updated data 622 may be received and processed by virtual desktop clients 660A-660N on the corresponding devices, e.g., through the abstraction layer 650 of the virtual desktop service 610 that provides a uniform interface to different types of user devices. An updated GUI may be rendered and displayed on each of the user devices. The updated GUI may be generated based (at least in part) on the updated data 622. In one embodiment, the data updates 622 may vary from device to device. For example, data changes may be displayed on all devices, but cursor movement based on user feedback may be displayed only on the device that is supplying the user feedback. In this way, changes to cursor movement are displayed only on the device currently being operated by the user, while other types of updated data 622 are sent to other user devices including the user device currently being operated. One or more of the user devices 630A-630N may represent read-only devices that are not permitted to alter the virtual desktop instance 610 or virtual desktop data 620 but that are configured to display a GUI representing the instance. The updated data 622 may include data that is not necessarily visual or used to update the GUIs 640A-640N, e.g., the contents of a clipboard as generated by the device 630A and propagated to other devices 630B-630N.

Figure 10:
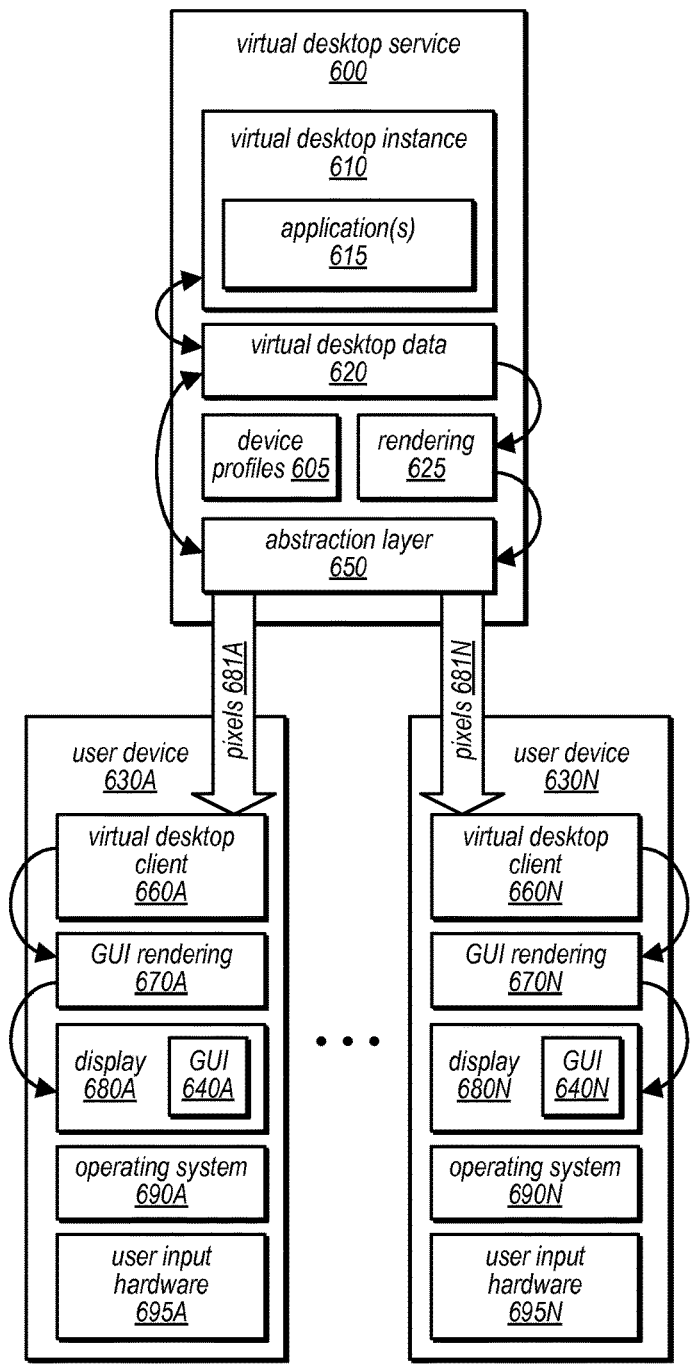
FIG. 10 is a block diagram illustrating further aspects of the virtual desktop service that provides virtual desktop access using device-native user interfaces, including the rendering by the virtual desktop service of at least a portion of a GUI for display on a user device, according to one embodiment.

FIG. 10 is a block diagram illustrating further aspects of the virtual desktop service that provides virtual desktop access using device-native user interfaces, including the rendering by the virtual desktop service of at least a portion of a GUI for display on a user device, according to one embodiment. In one embodiment, at least a portion of a GUI displayed on a particular user device may be rendered in the provider network and sent to the user device for display. In one embodiment, another portion of the GUI may be rendered (e.g., to generate pixels based on logical data associated with the virtual desktop instance) on the user device and composited with the pixel data supplied by the provider network. For example, the pixels rendered in the provider network may represent output of a resource-intensive application such as a computer-aided design (CAD) application or a game with three-dimensional (3D) graphics. The portion of pixels supplied to the user device by the provider network may be limited to the contents of one or more windows associated with corresponding applications; the remaining portion of the GUI (if any) may be rendered on the user device.

In one embodiment, the virtual desktop service 610 may determine the rendering capability of a user device, either by testing the device and determining performance metrics or by accessing a set of device profiles 605 that include relevant characteristics (e.g., hardware profiles and/or performance metrics for rendering) of the devices 630A-630N. The rendering capability may vary from user device to user device. The virtual desktop service 610 may determine how much of the GUI (if any) for the device to render in the provider network based (at least in part) on the rendering capability of the device. For example, if the device is capable of rendering 3D graphics for a particular application, then the device may be allowed to do so; if it lacks such a capability, then the provider network may render such output and stream the resulting pixels to the user device. As shown in the example of FIG. 10, the virtual desktop service 600 may include a rendering component 625 that may be implemented using resources of the provider network. Using the rendering component 625, the virtual desktop service 600 may generate pixel output 681A for user device 630A and pixel output 681N for user device 630N. The pixel output may vary in scope from target device to target device, e.g., based on the rendering capability of the device. The pixel output may also vary in other qualities (e.g., dimensions, color depth, and so on) from target device to target device, e.g., based on characteristics of the displays associated with the devices.

In one embodiment, all or part of a GUI for the virtual desktop instance may be streamed from an external source. For example, if one of the applications 615 is configured to access a video stream from a source outside the virtual desktop service 600 or service provider network 130, such as a web-based video service, than that external source may provide pre-rendered pixel data to be shown on one or more of the displays 680A-680N. The pixel data from the external source (e.g., frames of a video) may take up an entire display (e.g., in full-screen video mode) or be combined with other graphical elements that are rendered on the devices 630A-630N and/or virtual desktop service 600. The external source may represent an edge server that is selected to provide the pixel stream for network or performance optimization.

Figure 11A:
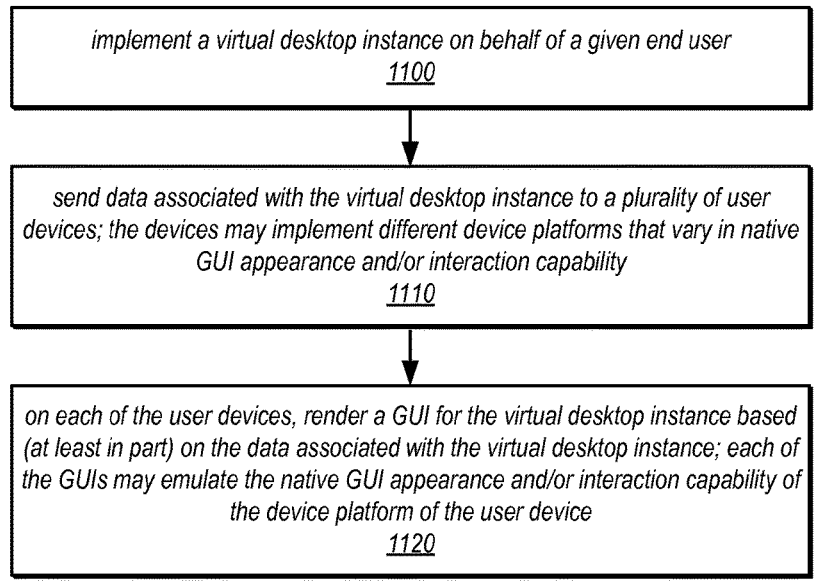
FIG. 11A is a flow diagram illustrating one embodiment of a method for providing virtual desktop access using device-native user interfaces.

FIG. 11A is a flow diagram illustrating one embodiment of a method for providing virtual desktop access using device-native user interfaces. As shown in 1100, a virtual desktop instance may be implemented on behalf of a given end user. A service provider network may include a plurality of computing nodes (for example, computing devices as shown in FIG. 12) that collectively provide a virtual desktop service to one or more clients of the provider network. The provider network may implement a virtualized computing resource instance executing on one of the computing nodes, and the virtualized computing resource instance may implement the virtual desktop instance as discussed above with respect to FIG. 1 through FIG. 5. One or more applications may be installed on the virtual desktop instance and executed using the virtualized computing resource instance. The virtual desktop service may maintain the virtual desktop, e.g., by maintaining data such as configuration data and application data usable to generate a graphical user interface (GUI) for the virtual desktop instance and run the application(s). The graphical depiction of a set of resources associated with the virtual desktop instance (e.g., one or more graphical indicators of applications, one or more windows associated with applications, one or more interface elements for browsing files or folders, one or more interface elements for browsing available applications or switching running applications, and so on) may collectively be referred to as a virtual desktop.

The virtual desktop service may permit the user to access the virtual desktop instance using one or more end user devices, as discussed below in 1110 and 1120. The user devices may include, for example, mobile devices such as smartphones and tablets, desktop computers, laptop computers, wearable devices, home automation devices, and any other suitable computing devices. The user devices may be operated by a single user and/or accessible to a single user account associated with the virtual desktop instance (e.g., all the devices may have suitable access credentials for the virtual desktop instance). At least some of the user devices may be heterogeneous, such that the devices may implement different device platforms. As used herein, the term "device platform" generally includes a combination of operating system software and device hardware. Devices with different device platforms may run different families of operating systems. Devices with different device platforms may be based on different hardware platforms or different families of computing hardware, such as different families of central processing units (CPUs). The different device platforms may differ in the native appearance of their GUIs and/or interaction capabilities (e.g., in the type of user input hardware they include or support). Typically, each of the user devices may have an associated display, e.g., an integrated display on a mobile device or laptop computer, to which the device can display graphical output. The displays associated with the user devices may also have different characteristics, such as different dimensions (e.g., in terms of pixels), different physical sizes, different color depths, and/or the presence or absence of touchscreen input capability.

As shown in 1110, data associated with the virtual desktop instance may be sent to a first user device, e.g., by the virtual desktop service. As shown in 1120, the data associated with the virtual desktop instance may also be sent to a second user device, e.g., by the virtual desktop service. The data may include, for example, an indication of available applications, an indication of applications that are currently open and/or executing, an indication of windows that are open on the virtual desktop instance, an indication of folders and/or files that are browsable, and/or any other data suitable for generating a GUI for the virtual desktop instance. The data may be packaged as one or more objects or other logical representations and may not include rendered pixels (with the potential exception of any pre-rendered icons or other graphical elements, e.g., icons representing applications or folders). The data may be received and processed by a virtual desktop client on the corresponding device, e.g., through an abstraction layer of the virtual desktop service that provides a uniform interface to different types of user devices. The implementation of the virtual desktop client may vary from user device to user device, but at least some of the functionality of the client may be similar across different user devices. In one embodiment, the data associated with the virtual desktop instance may sent to the user devices in response to the one or more calls received (e.g., by an abstraction layer of the virtual desktop service) from the devices. For example, the calls may represent queries for the windows or other interface elements to display in a GUI for the virtual desktop instance.

The first user device may implement a first device platform. As shown in 1120, a first GUI for the virtual desktop interface may be generated using the data and displayed on a first display associated with the first user device. The second user device may implement a second device platform that differs (at least in part) from the first device platform. For example, the first user device may be a smartphone or tablet running a mobile operating system (OS) (e.g., iOS® or Android®) while the second user device may be a desktop or laptop computer running a different operating system (e.g., OS X®, Windows®, or Linux®) on a different family of hardware. As another example, the first and second user devices may be smartphones running different families of mobile operating systems (e.g., iOS® or Android®). As yet another example, the first and second user devices may be desktop or laptop computers running different families of conventional PC operating systems (e.g., OS X®, Windows®, or Linux®). As shown in 1120, a second GUI for the virtual desktop interface may be generated using the data and displayed on a second display associated with the second user device.

The device platforms may differ in terms of their native GUI appearance as exemplified by the OS of the device platform, e.g., for windows, files, folders, application icons, typefaces, color schemes, and so on. The device platforms may differ in terms of their interaction capability, e.g., on the available input modalities such as mouse or trackpad input, keyboard input, speech input, touchscreen input, thermometer input, accelerometer input, and so on. The first GUI may emulate or mimic a native appearance and/or interaction capability of the first device platform, and the second GUI may emulate or mimic a native appearance and/or interaction capability of the second device platform. The second GUI may differ (at least in part) from the first GUI. For example, the second display may be substantially larger (in terms of physical dimensions) than the first display, and so a greater amount of virtual desktop data may be displayed in the second GUI than in the first GUI. In one embodiment, the first GUI may display a first subset of information displayed in the second GUI and hide a second subset of information displayed in the second GUI, e.g., by stacking windows on top of one another due to a reduced display size. Similarly, the first GUI may comprise a different layout than the second GUI. As another example, the second device may include a mouse or trackpad input device but not a touchscreen display while the first device (e.g., a touch-capable mobile device) may not include a mouse or trackpad, and so the second GUI may be tailored for mouse or trackpad input while the first GUI may be tailored for touchscreen input. Both GUIs may be displayed simultaneously on the two user devices. In one embodiment, both user devices may access the virtual desktop instance in parallel. In one embodiment, at least a portion of the first GUI and second GUI may be rendered (to generate pixels for display) on the corresponding user devices based on the data sent by the virtual desktop service.

Similar operations may be performed for one or more additional user devices that may implement the same or different device platforms as the first and second user devices. Thus, as shown in 1110 and 1120, a uniform interface to a single virtual desktop instance may be provided to heterogeneous user devices. Each of the user devices may (substantially in parallel) render and display a GUI for the virtual desktop that emulates the native appearance and interaction capability of the device platform. Accordingly, the various GUIs for the virtual desktop instance may vary from user device to user device in a manner that generally preserves the "look and feel" of other software (such as operating system software) on the devices.

In one embodiment, at least a portion of a GUI displayed on a user device may be rendered in the provider network and sent to the user device for display. In one embodiment, another portion of the GUI may be rendered (e.g., to generate pixels based on logical data associated with the virtual desktop instance) on the user device and composited with the pixel data supplied by the provider network. For example, the pixels rendered in the provider network may represent output of a resource-intensive application such as a computer-aided design (CAD) application or a game with three-dimensional (3D) graphics. The portion of pixels supplied to the user device by the provider network may be limited to the contents of one or more windows associated with corresponding applications; the remaining portion of the GUI (if any) may be rendered on the user device. In one embodiment, the virtual desktop service may determine the rendering capability of a user device, either by testing the device or by accessing a device profile. The rendering capability may vary from user device to user device. The virtual desktop service may determine how much of the GUI (if any) for the device to render in the provider network based (at least in part) on the rendering capability of the device. For example, if the device is capable of rendering 3D graphics for a particular application, then the device may be allowed to do so; if it lacks such a capability, then the provider network may render such output and stream the resulting pixels to the user device.

Figure 11B:
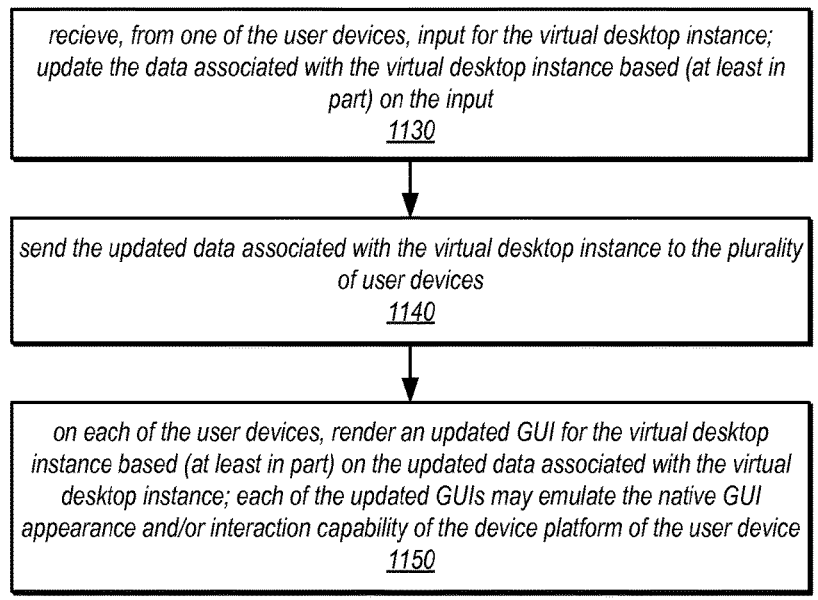
FIG. 11B is a flow diagram illustrating one embodiment of a method for publishing updates to user devices having access to the same virtual desktop.

In one embodiment, updates to the virtual desktop may be published or otherwise pushed to connected user devices. FIG. 11B is a flow diagram illustrating one embodiment of a method for publishing updates to user devices having access to the same virtual desktop. As shown in 1130, input for the virtual desktop instance may be received from one of the user devices connected to the virtual desktop instance. Data associated with the virtual desktop instance may be updated based (at least in part) on the input. For example, the input may represent a change to the topmost window of a set of windows or another reconfiguration of windows on the virtual desktop. As another example, the input may represent a change to data in an application window.

As shown in 1140, the updated data associated with the virtual desktop instance may be sent to all the connected user devices. In one embodiment, the updated data may be sent to the user devices without the need for the devices to request updates; in another embodiment, user devices may poll the virtual desktop service for updates. The updated data may include, for example, an indication of available applications, an indication of applications that are currently open and/or executing, an indication of windows that are open on the virtual desktop instance, an indication of folders and/or files that are browsable, and/or any other data suitable for generating a GUI for the virtual desktop instance. The updated data may be packaged as one or more objects or other logical representations and may not include rendered pixels (with the potential exception of any pre-rendered icons or other graphical elements, e.g., icons representing applications or folders). The updated data may be received and processed by virtual desktop clients on the corresponding devices, e.g., through an abstraction layer of the virtual desktop service that provides a uniform interface to different types of user devices. As shown in 1150, an updated GUI may be rendered and displayed on each of the user devices. The updated GUI may be generated based (at least in part) on the updated data.

Figure 11C:
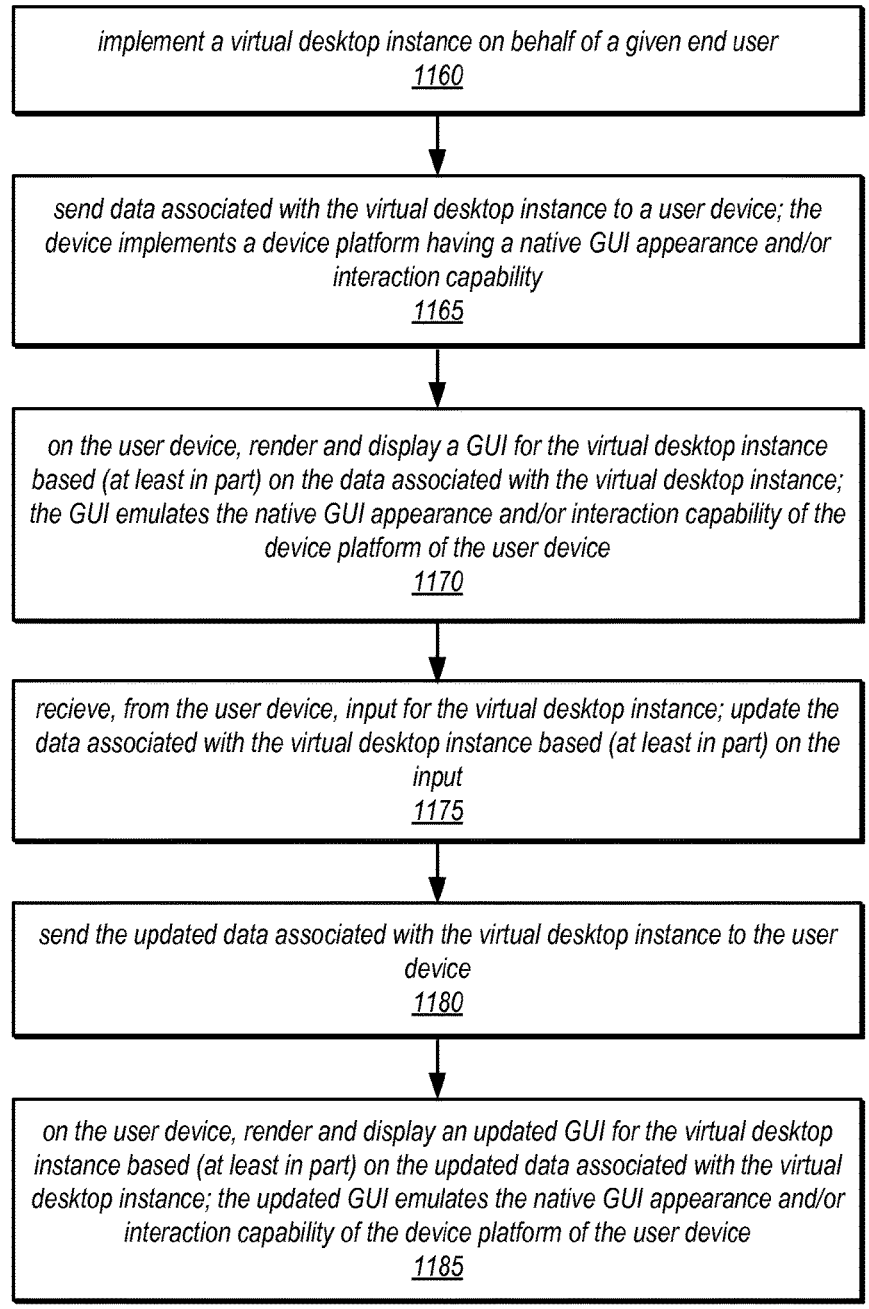
FIG. 11C is a flow diagram illustrating one embodiment of a method for rendering and updating a device-native user interface for a user device that accesses a virtual desktop.

FIG. 11C is a flow diagram illustrating one embodiment of a method for rendering and updating a device-native user interface for a user device that accesses a virtual desktop. As shown in 1160, a virtual desktop instance may be implemented on behalf of a given end user. A service provider network may include a plurality of computing nodes (for example, computing devices as shown in FIG. 12) that collectively provide a virtual desktop service to one or more clients of the provider network. The provider network may implement a virtualized computing resource instance executing on one of the computing nodes, and the virtualized computing resource instance may implement the virtual desktop instance as discussed above with respect to FIG. 1 through FIG. 5. One or more applications may be installed on the virtual desktop instance and executed using the virtualized computing resource instance. The virtual desktop service may maintain the virtual desktop, e.g., by maintaining data such as configuration data and application data usable to generate a graphical user interface (GUI) for the virtual desktop instance and run the application(s). The graphical depiction of a set of resources associated with the virtual desktop instance (e.g., one or more graphical indicators of applications, one or more windows associated with applications, one or more interface elements for browsing files or folders, one or more interface elements for browsing available applications or switching running applications, and so on) may collectively be referred to as a virtual desktop.

As shown in 1165, data associated with the virtual desktop instance may be sent to a user device, e.g., by the virtual desktop service. The data may include, for example, an indication of available applications, an indication of applications that are currently open and/or executing, an indication of windows that are open on the virtual desktop instance, an indication of folders and/or files that are browsable, and/or any other data suitable for generating a GUI for the virtual desktop instance. The data may be packaged as one or more objects or other logical representations and may not include rendered pixels (with the potential exception of any pre-rendered icons or other graphical elements, e.g., icons representing applications or folders). The data may be received and processed by a virtual desktop client on the user device, e.g., through an abstraction layer of the virtual desktop service that provides a uniform interface to different types of user devices. The implementation of the virtual desktop client may vary from user device to user device, but at least some of the functionality of the client may be similar across different user devices. In one embodiment, the data associated with the virtual desktop instance may sent to the user device in response to the one or more calls received (e.g., by an abstraction layer of the virtual desktop service) from the device. For example, the calls may represent queries for the windows or other interface elements to display in a GUI for the virtual desktop instance.

The user device may implement a device platform. As shown in 1170, a GUI for the virtual desktop interface may be generated using the data and displayed on a first display associated with the first user device. The device platforms may be associated with a native GUI appearance as exemplified by the OS of the device platform, e.g., for windows, files, folders, application icons, typefaces, color schemes, and so on. The device platform may also be associated with a native interaction capability, e.g., on the available input modalities such as mouse or trackpad input, keyboard input, speech input, touchscreen input, thermometer input, accelerometer input, and so on. The GUI may emulate or mimic the native appearance and/or interaction capability of the device platform. In one embodiment, at least a portion of the GUI may be rendered (to generate pixels for display) on the user device based on the data sent by the virtual desktop service. Accordingly, the GUI for the virtual desktop instance may generally preserve the "look and feel" of other software (such as operating system software) on the device.

As shown in 1175, input for the virtual desktop instance may be received from the user device. Data associated with the virtual desktop instance may be updated based (at least in part) on the input. For example, the input may represent a change to the topmost window of a set of windows or another reconfiguration of windows on the virtual desktop. As another example, the input may represent a change to data in an application window.

As shown in 1180, the updated data associated with the virtual desktop instance may be sent to the user device. In one embodiment, the updated data may be sent to the user device without the need for the device to request updates; in another embodiment, the user device may poll the virtual desktop service for updates. The updated data may include, for example, an indication of available applications, an indication of applications that are currently open and/or executing, an indication of windows that are open on the virtual desktop instance, an indication of folders and/or files that are browsable, and/or any other data suitable for generating a GUI for the virtual desktop instance. The updated data may be packaged as one or more objects or other logical representations and may not include rendered pixels (with the potential exception of any pre-rendered icons or other graphical elements, e.g., icons representing applications or folders). The updated data may be received and processed by virtual desktop clients on the corresponding devices, e.g., through an abstraction layer of the virtual desktop service that provides a uniform interface to different types of user devices. In one embodiment, if any additional user devices are also connected to the virtual desktop instance, the updated data may be sent only to the user device that provided the user input or otherwise withheld from at least one of the additional user devices. As shown in 1185, an updated GUI may be rendered and displayed on the user device. The updated GUI may be generated based (at least in part) on the updated data and may emulate the native appearance and/or interaction capability of the user device.

Illustrative System

In at least some embodiments, a service that implements some or all of the techniques described herein may include a general-purpose computer system that includes or is configured to access a non-transitory computer-accessible (e.g., computer-readable) media, such as computer system 1200 illustrated in FIG. 12. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 1200 that has been configured to provide the functionality of those components. In the illustrated embodiment, computer system 1200 includes one or more processors 1210A-1210N coupled to a system memory 1220 via an input/output (I/O) interface 1230. Computer system 1200 further includes one or more network interfaces 1240 coupled to I/O interface 1230. In some embodiments, network interfaces 1240 may include two or more network interfaces (including, e.g., one configured for communication between a virtualized computing resource hosted on the computer system 1200 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1240 may be a single network interface.

In various embodiments, computer system 1200 may be a uniprocessor system including one processor, or a multiprocessor system including several processors 1210A-1210N (e.g., two, four, eight, or another suitable number). Processors 1210A-1210N may be any suitable processors capable of executing instructions. For example, in various embodiments, processors 1210A-1210N may be processors implementing any of a variety of instruction set architectures (ISAs), such as the x86, PowerPC, SPARC, or MIPS ISAs, or any other suitable ISA. In multiprocessor systems, each of processors 1210A-1210N may commonly, but not necessarily, implement the same ISA.

System memory 1220 may be configured to store instructions and data accessible by processor(s) 1210A-1210N. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1220 as code 1225 and data 1226. For example, data 1226 may include information representing the assignment of selected applications to particular end users and/or user groups, constraints and/or configuration parameter settings for the selected applications, users, and catalogs, and may be stored in any of a variety of data structures or database tables within memory 1220 on one or more computing nodes of a service provider system and/or client computing device.

In one embodiment, I/O interface 1230 may be configured to coordinate I/O traffic between processor(s) 1210A-1210N, system memory 1220, and any peripheral devices in the device, including any of network interface(s) 1240 or other peripheral interfaces. In some embodiments, I/O interface 1230 may perform any necessary protocol, timing or other data transformations to convert data signals from one component (e.g., system memory 1220) into a format suitable for use by another component (e.g., processors 1210A-1210N). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processors 1210A-1210N.

Network interface(s) 1240 may be configured to allow data to be exchanged between computer system 1200 and other devices 1260 attached to a network or networks 1250, such as other computer systems or devices as illustrated in the figures, for example. In various embodiments, network interface(s) 1240 may support communication via any suitable wired or wireless general data networks, such as types of Ethernet network, for example. Additionally, network interface(s) 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for implementing various embodiments of the techniques described herein. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1200 via I/O interface 1230. A non-transitory computer-accessible (e.g., computer-readable) storage medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface(s) 1240.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a plurality of computing nodes that collectively provide a virtual desktop service to one or more clients of a provider network, wherein each of the computing nodes comprises at least one processor and a memory; and
   a virtualized computing resource instance executing on one of the computing nodes, wherein the virtualized computing resource instance implements a virtual desktop instance on behalf of a user, and wherein one or more applications are installed on the virtual desktop instance and executed using the virtualized computing resource instance;
   wherein the virtual desktop service is configured to:
      provide access to the virtual desktop instance to a first user device that implements a first device platform, wherein a first graphical user interface (GUI) for the virtual desktop instance is displayed on a first display associated with the first user device, and wherein the first GUI emulates the appearance and interaction capability of the first device platform; and
      provide access to the virtual desktop instance to a second user device that implements a second device platform differing from the first device platform, wherein a second GUI for the virtual desktop instance is displayed on a second display associated with the second user device, and wherein the second GUI emulates the appearance and interaction capability of the second device platform differing at least in part from the appearance and interaction capability of the first device platform.

2. The system as recited in claim 1, wherein the virtual desktop service comprises an abstraction layer, and wherein the virtual desktop service is further configured to:
   receive a first set of one or more calls to the abstraction layer from a first virtual desktop client executing on the first user device, wherein the data associated with the virtual desktop instance is sent to the first user device in response to the first set of one or more calls; and
   receive a second set of one or more calls to the abstraction layer from a second virtual desktop client executing on the second user device, wherein the data associated with the virtual desktop instance is sent to the second user device in response to the second set of one or more calls.

3. The system as recited in claim 1, wherein data associated with the virtual desktop instance comprises a logical representation of one or more items to be displayed on a virtual desktop, wherein the first GUI comprises a first set of pixels generated by the first user device based at least in part on the data associated with the virtual desktop instance, and wherein the second GUI comprises a second set of pixels generated by the second user device based at least in part on the data associated with the virtual desktop instance.

4. The system as recited in claim 1, wherein the virtual desktop service is further configured to:
   generate updated data associated with the virtual desktop instance based at least in part on input received from the first user device or the second user device;
   send the updated data to the first user device, wherein the first GUI is updated using the updated data and displayed on the first display associated with the first user device; and
   send the updated data to the second user device, wherein the second GUI is updated using the updated data and displayed on the second display associated with the second user device.

5. A method, comprising:
   performing, by one or more computing devices that collectively implement a virtual desktop service:
      implementing a virtual desktop instance on behalf of a user, wherein one or more applications are installed on the virtual desktop instance and executed using a virtualized computing resource instance;
      creating modified data associated with the virtual desktop instance, wherein the modified data includes one or more modifications to an appearance of the virtual desktop instance so that at least a portion of a graphical user interface (GUI) for the virtual desktop instance emulates an appearance and interaction capability of a user device having a device platform; and providing the modified data associated with the virtual desktop instance to the user device that implements the device platform, wherein at least a portion of the GUI for the virtual desktop instance is rendered on the user device using the modified data.

6. The method as recited in claim 5, further comprising: creating further modified data associated with the virtual desktop instance, wherein the further modified data includes one or more additional modifications to the appearance of the virtual desktop instance so that at least a portion of an additional graphical user interface (GUI) for the virtual desktop instance emulates an appearance and interaction capability of an additional user device having an additional device platform; and providing the further modified data associated with the virtual desktop instance to the additional user device that implements the additional device platform, wherein at least a portion of the additional GUI for the virtual desktop instance is rendered on the additional user device using the further modified data, and wherein the additional GUI on the additional user device differs at least in part from the GUI displayed on the user device.

7. The method as recited in claim 6, wherein the GUI displays a first subset of information displayed in the additional GUI and hides a second subset of information displayed in the additional GUI, or wherein the GUI comprises a different layout than the additional GUI.

8. The method as recited in claim 6, further comprising: receiving input to the GUI from the user device, wherein the input is entered using a particular modality of the interaction capability of the device platform, and wherein the additional device lacks the particular modality of the interaction capability of the device platform.

9. The method as recited in claim 6, wherein the virtual desktop service comprises an abstraction layer, and wherein the method further comprises:

receiving a first set of one or more calls to the abstraction layer from a virtual desktop client executing on the user device, wherein the modified data associated with the virtual desktop instance is provided to the user device in response to the first set of one or more calls; and receiving a second set of one or more calls to the abstraction layer from an additional virtual desktop client executing on the additional user device, wherein the further modified data associated with the virtual desktop instance is provided to the additional user device in response to the second set of one or more calls.

10. The method as recited in claim 5, wherein the modified data associated with the virtual desktop instance comprises a logical representation of one or more items to be displayed on a virtual desktop.

11. The method as recited in claim 5, wherein the modified data associated with the virtual desktop instance is modified based at least in part on input received from the user device, and wherein the method further comprises:

withholding the modified data associated with the virtual desktop instance from an additional user device connected to the virtual desktop instance.

12. The method as recited in claim 5, further comprising: determining a rendering capability of the user device;

rendering, using the virtualized computing resource instance, a set of pixels associated with the virtual desktop instance and based at least in part on the rendering capability of the user device; and sending the set of pixels to the user device, wherein the set of pixels are displayed on a display associated with the user device.

13. A non-transitory computer-readable storage medium storing program instructions computer-executable to perform:

implementing a virtual desktop instance on behalf of a user, wherein one or more applications are installed on the virtual desktop instance and executed using a virtualized computing resource instance;

sending data associated with the virtual desktop instance to a first user device that implements a first device platform, wherein a first graphical user interface (GUI) for the virtual desktop instance is rendered using the data and displayed on a first display associated with the first user device; and sending the data associated with the virtual desktop instance to a second user device that implements a second device platform differing from the first device platform, wherein a second GUI for the virtual desktop instance is rendered using the data and displayed on a second display associated with the second user device, and wherein the second GUI differs at least in part from the first GUI in appearance or interaction capability.

14. The non-transitory computer-readable storage medium as recited in claim 13, wherein the first GUI emulates an appearance and interaction capability of the first device platform, and wherein the second GUI emulates an appearance and interaction capability of the second device platform differing at least in part from the appearance and interaction capability of the first device platform.

15. The non-transitory computer-readable storage medium as recited in claim 13, wherein the first GUI displays a first subset of information displayed in the second GUI and hides a second subset of information displayed in the second GUI, and wherein the first GUI comprises a different layout than the second GUI.

16. The non-transitory computer-readable storage medium as recited in claim 13, wherein the program instructions are further computer-executable to perform:

receiving a first set of user input for the virtual desktop instance from the first user device, wherein the first set of user input comprises touchscreen input entered using the first GUI; and receiving a second set of user input for the virtual desktop instance from the second user device, wherein the second set of user input comprises mouse or trackpad input entered using the second GUI, and wherein the first user device lacks a mouse or trackpad.

17. The non-transitory computer-readable storage medium as recited in claim 13, wherein a virtual desktop service comprises an abstraction layer, and wherein the program instructions are further computer-executable to perform:

receiving a first set of one or more calls to the abstraction layer from a first virtual desktop client executing on the first user device, wherein the data associated with the virtual desktop instance is sent to the first user device in response to the first set of one or more calls; and receiving a second set of one or more calls to the abstraction layer from a second virtual desktop client executing on the second user device, wherein the data associated with the virtual desktop instance is sent to the second user device in response to the second set of one or more calls.

18. The non-transitory computer-readable storage medium as recited in claim 13, wherein the data associated with the virtual desktop instance comprises a logical representation of one or more items to be displayed on a virtual desktop, wherein the first GUI comprises a first set of pixels generated by the first user device based at least in part on the data associated with the virtual desktop instance, and wherein the second GUI comprises a second set of pixels generated by the second user device based at least in part on the data associated with the virtual desktop instance.

19. The non-transitory computer-readable storage medium as recited in claim 13, wherein the program instructions are further computer-executable to perform:
- generating updated data associated with the virtual desktop instance based at least in part on input received from the first user device or the second user device;
- sending the updated data to the first user device, wherein the first GUI is updated using the updated data and displayed on the first display associated with the first user device; and
- sending the updated data to the second user device, wherein the second GUI is updated using the updated data and displayed on the second display associated with the second user device.

20. The non-transitory computer-readable storage medium as recited in claim 13, wherein a set of pixels is rendered on an external server and displayed on the first display.

* * * * *